(12) United States Patent
Patel et al.

(10) Patent No.: US 12,477,033 B2
(45) Date of Patent: Nov. 18, 2025

(54) PFCP SESSION LOAD BALANCER

(71) Applicant: Arrcus Inc., San Jose, CA (US)

(72) Inventors: Keyur Patel, San Jose, CA (US); Tetsuya Murakami, Sunnyvale, CA (US)

(73) Assignee: Arrcus Inc., San Jose, CA (US)

( * ) Notice: Subject to any disclaimer, the term of this patent is extended or adjusted under 35 U.S.C. 154(b) by 624 days.

(21) Appl. No.: 17/553,522

(22) Filed: Dec. 16, 2021

(65) Prior Publication Data

US 2022/0345519 A1   Oct. 27, 2022

Related U.S. Application Data

(63) Continuation-in-part of application No. 17/488,833, filed on Sep. 29, 2021, which is a continuation-in-part of application No. 17/362,071, filed on Jun. 29, 2021, now Pat. No. 11,849,381, and a continuation-in-part of application No. 17/240,726, filed on Apr. 26, 2021, now Pat. No. 11,632,692.

(51) Int. Cl.
| | | |
|---|---|---|
| *G06F 15/173* | (2006.01) | |
| *G06F 15/16* | (2006.01) | |
| *H04L 67/1008* | (2022.01) | |
| *H04L 67/101* | (2022.01) | |
| *H04L 67/1027* | (2022.01) | |
| *H04L 67/141* | (2022.01) | |
| *H04L 67/145* | (2022.01) | |

(52) U.S. Cl.
CPC ........ *H04L 67/101* (2013.01); *H04L 67/1008* (2013.01); *H04L 67/1027* (2013.01); *H04L 67/141* (2013.01); *H04L 67/145* (2013.01)

(58) Field of Classification Search
CPC .............. H04L 67/101; H04L 67/1008; H04L 67/1027; H04L 67/141; H04L 67/145
USPC ................................. 709/225–228, 202–203
See application file for complete search history.

(56) References Cited

U.S. PATENT DOCUMENTS

| | | | |
|---|---|---|---|
| 7,613,822 B2 * | 11/2009 | Joy | ..................... H04L 67/1008 709/227 |
| 8,078,758 B1 | 12/2011 | Callon | |
| 8,891,522 B2 | 11/2014 | Fletcher | |
| 9,544,185 B1 | 1/2017 | Yadav | |
| 9,705,781 B1 | 7/2017 | Medved | |
| 10,419,328 B1 | 9/2019 | Dave | |
| 10,761,813 B1 | 9/2020 | Echeverria | |

(Continued)

FOREIGN PATENT DOCUMENTS

WO   2022115129   6/2022

*Primary Examiner* — Bharat Barot
(74) *Attorney, Agent, or Firm* — David R. Stevens; Stevens Law Group

(57) ABSTRACT

Importing of a UE address into a VRF of perimeter equipment is facilitate by receiving a VPN update from the perimeter equipment including a route target of the perimeter equipment and a gNodeB address. In addition, session information is obtained by intercepting traffic between the UE address and a UPF. The session information including the UE address and address of a gNodeB to which the UE is connected. By matching the gNodeB addresses from the VPN update and the session information, the route target of the perimeter equipment to which the UE is connected may be determined. The UE address may then be imported exclusively into the VRF of the perimeter equipment.

17 Claims, 21 Drawing Sheets

(56) References Cited

U.S. PATENT DOCUMENTS

| | | | |
|---|---|---|---|
| 10,775,976 B1 | 9/2020 | Abdul-Jawad | |
| 10,776,441 B1 | 9/2020 | Echeverria | |
| 11,184,431 B2* | 11/2021 | Ozawa | H04L 67/1001 |
| 11,477,288 B1 | 10/2022 | Singh et al. | |
| 11,843,657 B2* | 12/2023 | Sorenson, III | H04L 67/1023 |
| 2004/0268358 A1* | 12/2004 | Darling | H04L 67/1001 |
| | | | 718/105 |
| 2005/0117595 A1 | 6/2005 | El-Beik | |
| 2006/0106941 A1 | 5/2006 | Singhal | |
| 2006/0146991 A1 | 7/2006 | Thompson | |
| 2006/0203747 A1 | 9/2006 | Wright | |
| 2007/0183404 A1 | 8/2007 | Hofer | |
| 2011/0268127 A1* | 11/2011 | Dhar | H04L 12/4641 |
| | | | 370/401 |
| 2014/0376402 A1 | 12/2014 | Dutt | |
| 2015/0131663 A1 | 5/2015 | Brar | |
| 2015/0326441 A1 | 11/2015 | Smith | |
| 2016/0301579 A1* | 10/2016 | Djukic | H04L 41/5058 |
| 2018/0077229 A1* | 3/2018 | Bharrat | H04L 67/1027 |
| 2018/0167476 A1 | 6/2018 | Hoffner | |
| 2018/0262454 A1 | 9/2018 | Zandi et al. | |
| 2018/0262585 A1 | 9/2018 | Zandi et al. | |
| 2018/0262592 A1 | 9/2018 | Zandi et al. | |
| 2018/0278519 A1 | 9/2018 | Means | |
| 2018/0316639 A1 | 11/2018 | Cullen | |
| 2019/0182266 A1 | 6/2019 | Doron | |
| 2019/0199789 A1* | 6/2019 | Abhigyan | H04L 67/1029 |
| 2019/0230011 A1 | 7/2019 | Gandham | |
| 2019/0230112 A1 | 7/2019 | Gandham | |
| 2019/0230127 A1 | 7/2019 | Gandham | |
| 2019/0349396 A1 | 11/2019 | Compton | |
| 2020/0007435 A1 | 1/2020 | Paida et al. | |
| 2020/0044892 A1 | 2/2020 | Allan | |
| 2020/0065141 A1 | 2/2020 | Pai et al. | |
| 2020/0068014 A1 | 2/2020 | Sarker et al. | |
| 2020/0106696 A1 | 4/2020 | Michael | |
| 2020/0136844 A1 | 4/2020 | Hill | |
| 2020/0162371 A1 | 5/2020 | Musku et al. | |
| 2020/0213358 A1 | 7/2020 | Helfinstine | |
| 2020/0267513 A1 | 8/2020 | Zhu | |
| 2020/0275356 A1 | 8/2020 | Forsman | |
| 2020/0344156 A1 | 10/2020 | Park | |
| 2020/0351188 A1 | 11/2020 | Arora et al. | |
| 2021/0067450 A1 | 3/2021 | Hanes et al. | |
| 2021/0092068 A1 | 3/2021 | Ismailsheriff et al. | |
| 2021/0144095 A1 | 5/2021 | Hanes et al. | |
| 2021/0250228 A1 | 8/2021 | Prakash et al. | |
| 2021/0377156 A1 | 12/2021 | Michael | |
| 2021/0377174 A1 | 12/2021 | Gulrajani et al. | |
| 2021/0409375 A1 | 12/2021 | Burakovsky | |
| 2022/0103463 A1 | 3/2022 | Margaria | |
| 2022/0269727 A1 | 8/2022 | Batsakis | |
| 2022/0303208 A1 | 9/2022 | Rahman et al. | |
| 2022/0345933 A1 | 10/2022 | Patel | |
| 2022/0345986 A1 | 10/2022 | Patel | |
| 2022/0393965 A1 | 12/2022 | Shen | |
| 2022/0400375 A1 | 12/2022 | Schmitt | |
| 2023/0025233 A1 | 1/2023 | Engi | |
| 2023/0033588 A1 | 2/2023 | Marupaduga | |
| 2023/0164065 A1 | 5/2023 | Vasseur et al. | |
| 2023/0261967 A1 | 8/2023 | Padi et al. | |
| 2023/0379319 A1 | 11/2023 | Saini | |
| 2024/0205130 A1 | 6/2024 | Babu | |
| 2024/0205137 A1 | 6/2024 | Babu | |

* cited by examiner

PFCP SESSION LOAD BALANCER

RELATED APPLICATIONS

This application is a continuation in part of U.S. patent application Ser. No. 17/488,833, filed on Sep. 29, 2021, which is a continuation in part of U.S. patent application Ser. No. 17/362,071, filed on Jun. 29, 2021 and is a continuation in part of U.S. patent application Ser. No. 17/240,726, filed on Apr. 26, 2021, the disclosures of which are hereby incorporated by reference herein in their entirety.

FIELD OF THE INVENTION

This application relates to routing of packets to and from a cellular data communication network.

BACKGROUND

Referring to FIG. 1A, in a conventional 5G cellular data communication network 100, user equipment (UE) 102 may transmit packets of gNodeB 106, which performs functions of receiving the packets by way of a radio antenna and transmitting them through gateway (GW) 108 to an IP network 110. In a conventional cellular data communication network, packets from UE 102 must be forwarded to a user plane function (UPF) 112, i.e. a UPF 112 associated with the GW 108 that received the packet initially. The UPF 112 may receive the packets over the network 110, which may be an internet protocol (IP) network 110 between the UPF and the GW 108. The UPF 112 may forward packets over another IP network 114 to a mobile edge computing (MEC) server 116. The MEC server 116 may be the destination of the packets, e.g. a server providing a service addressed by the packets or a gateway to access a wider network, such as the Internet.

Referring to FIG. 1B, in some cases packets may need to be redirected from a MEC server 116 associated with the UPF 112 to another MEC server 118. For example, the GW 108 may also be connected to one or more IP networks 120 coupling the MEC server 118 the GW 108. Upon failure of the MEC server 116, or redirection for some other purpose, packets may be redirected to the MEC server 118. However, current 5G protocols require that the packets be first routed to the UPF 112, which will then forward the packets to the MEC server 118 as shown in FIG. 1B. Traffic from the MEC server 118 to the UE 102 may follow the reverse path. This increases the latency of packets transmitted to and from the UE 102.

It would be an advancement in the art to provide an improved approach for handling redirection of packets in a cellular communication network.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
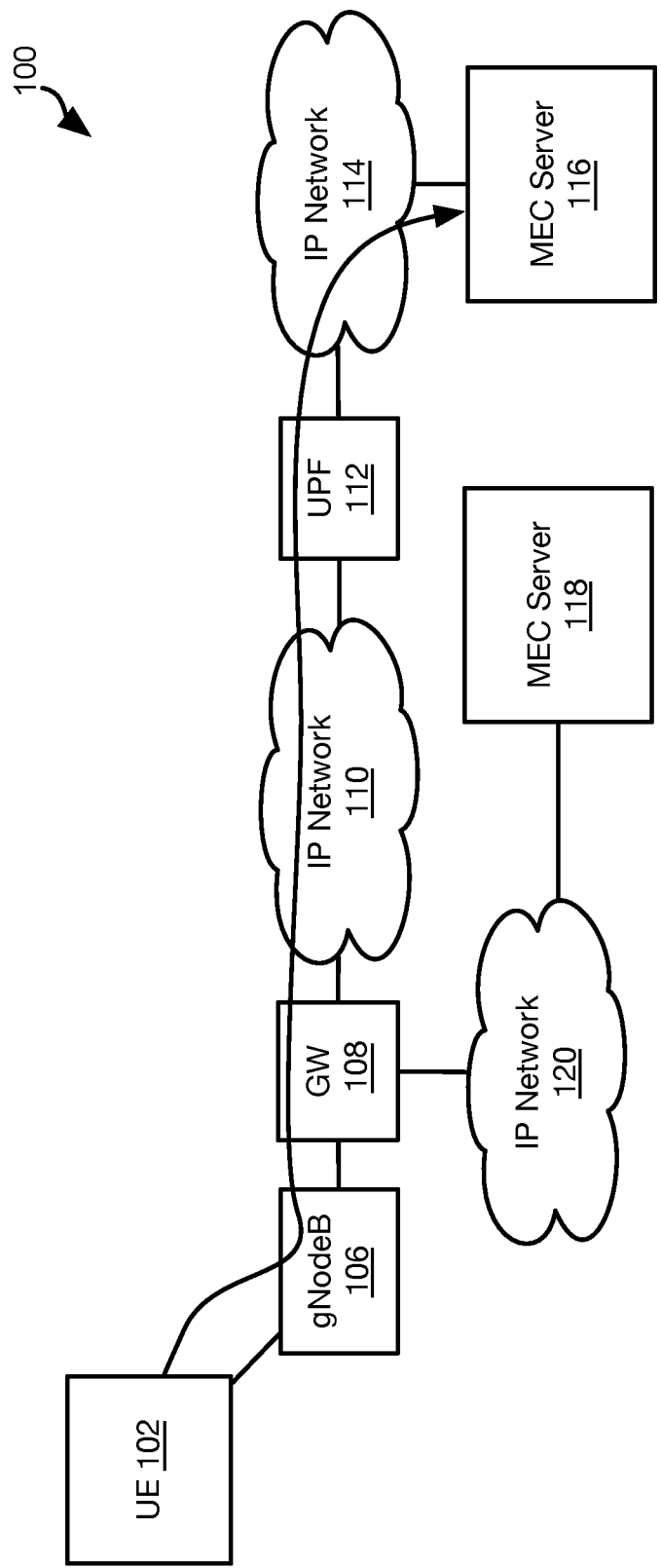
FIG. 1A is schematic block diagram illustrating routing of packets received over a cellular data communication network in accordance with the prior art.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1B:
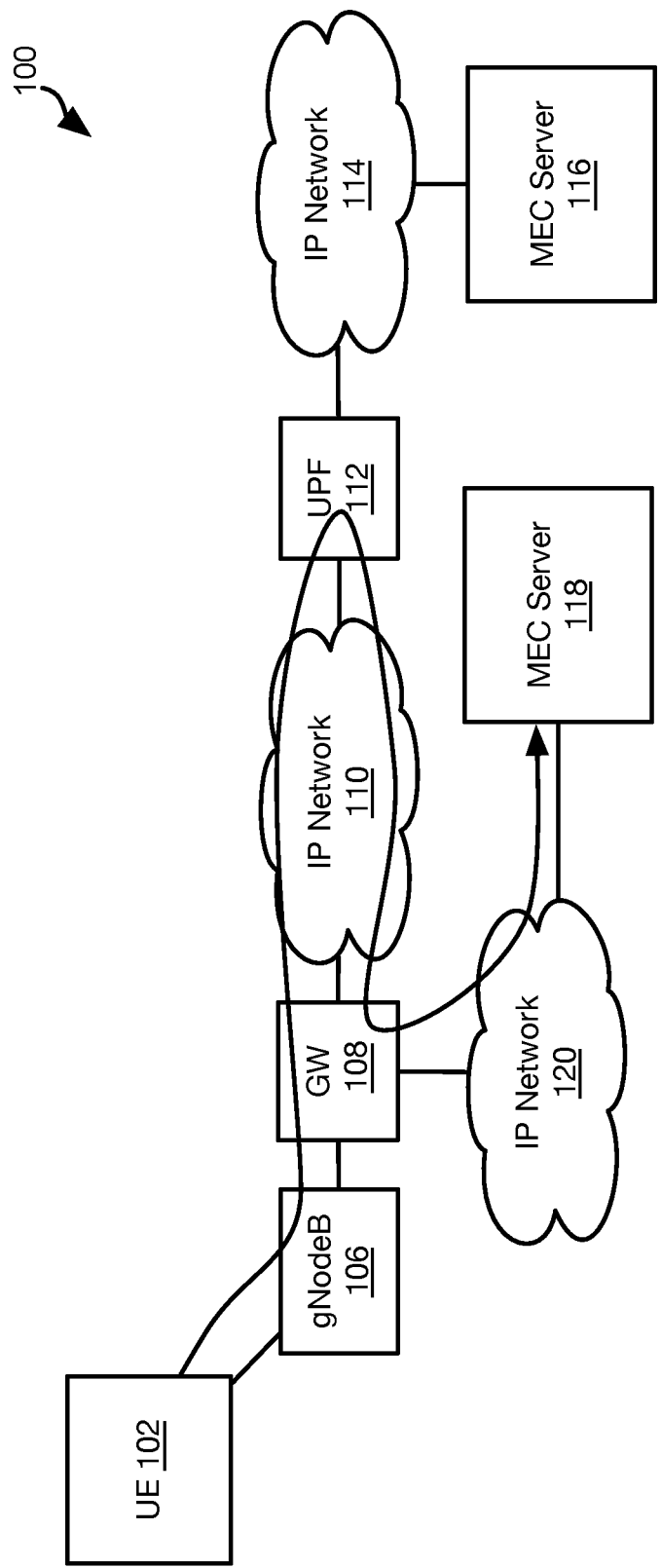
FIG. 1B is a schematic block diagram illustrating rerouting of packets received over a cellular data communication network in accordance with the prior art.
Figure 2:
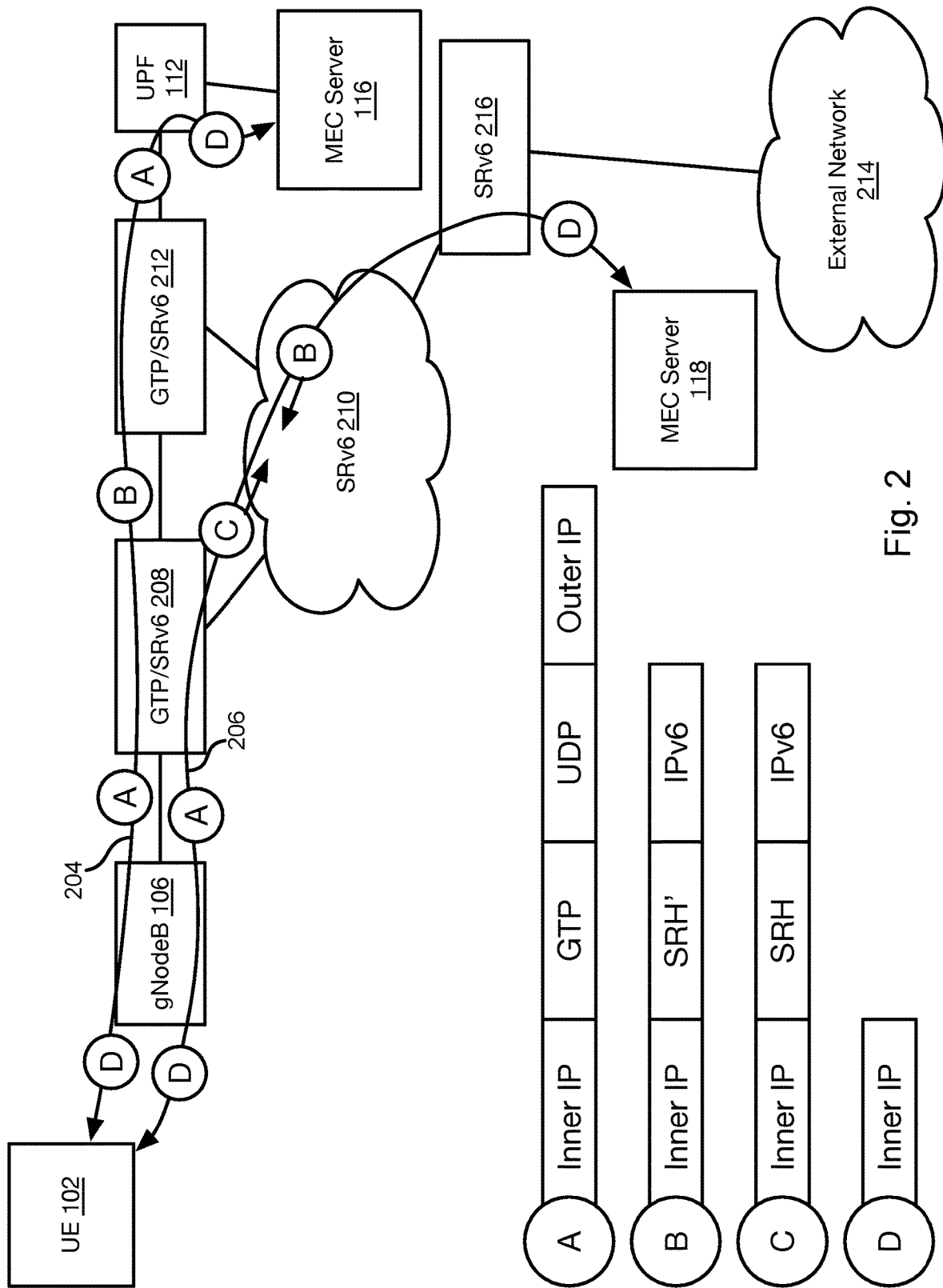
FIG. 2 is a schematic block diagram illustrating an approach for routing packets received over a cellular data communication network in accordance with an embodiment of the present invention.

Referring to FIG. 2, in some embodiments packets from the UE 102 are formatted as general packet radio service (GPRS) packets when received by gNodeB 106. The gNodeB 106 may control functioning of an RU (radio unit, i.e. antenna), DU (distributed Unit), and CU (Centralized Unit) and manage transfer of packets between UE 102 and the network 110. The gNodeB 106 may then encapsulate these packets within GPRS Tunneling Protocol (GTP) packets that are then forwarded to the UPF 112. Path 204 illustrates the path of packets that are sent to and from the UPF 112. Path 206 illustrates the path of packets that are redirected, such as to and from a different MEC server 118 as for FIG. 1B or other destination.

Packets output by the gNodeB 106 may be processed by translation module 208. In the illustrated embodiment, the translation module 208 translates back and forth between GTP and an internet protocol, i.e. a protocol that is not suitable for use in a cellular data network and is not GTP. In the illustrated embodiment, the internet protocol is SRv6 (segment routing over IPv6 dataplane). In the following description, it shall be understood that reference to transitions between GTP and SRv6 could be substituted with transitions between GTP and other internet protocols.

The translation module 208 may be interposed between the gNodeB 106 and an SRv6 network 210, e.g. a data plane and/or network with routing implemented according to SRv6 or other IP protocol. The UPF 112 may be connected to the SRv6 network 210 by another translation module 212. Note that in some embodiments, the translation module 208, network 210, and translation module 208 may be part of a common computing device, i.e. mounted to a common chassis. That common computing device may be collocated with one or both of the antenna 104 and gNodeB 106. The common computing device may also include the MEC server 116.

The network 210 may also be coupled to an external network 214, such as by an internet protocol routing module 216. The routing module 216 is an SRv6 router in the illustrated embodiment, but routers implementing other routing protocols may also be used. In some embodiments, the routing module 216 does not implement GTP protocol. The external network 214 may be a WAN, such as the Internet, and may connect the network 210 to another MEC server 118 or to any third party server providing a service to a UE 102.

In the illustrated embodiment, portions of the paths 204, 206 labeled as "A" may convey packets formatted as GTP packets (hereinafter "A-type packets"). A-type packets may include, in addition to payload data encapsulated thereby, some or all of an inner internet protocol (IP) header, a GTP header, a UDP (user datagram protocol) header, and an outer IP header. The inner IP header may be an IP header according to an IP protocol generated on the UE 102. The outer IP header may be an IP header according to the IP protocol, or a different IP protocol, that is generated by the gNodeB 106 and which defines information for routing the A-type packet over the network 210 to the UPF 112, MEC server 116, MEC server 118, or an the external network 214.

Portions of the paths 204, 206 labeled as "B" may convey packets formatted as internet protocol packets, such as SRv6 packets (hereinafter "B-type packets"). Such packets may include an inner IP header as defined above, and a segment routing header (SRH'), and an internet routing header such as an Ipv6 header. The SRH' of each B-type packet may be populated by the translation module 208, 212 that generated the B-type packet to include information from some or all of the GTP header, UDP header, and outer IP header of an A-type packet from which the B-type packet was translated. In particular, the information stored in the SRH' may include data sufficient to convert the B-type packet into an A-type packet (GTP packet) by another of the translation modules 208, 212. The Ipv6 field may be a packet formatted according to an internet protocol (IP), such as Ipv6 and include information sufficient to route the packet over an IP network, such as network 210, including a source IP address, destination IP address, and data for other fields as defined by Ipv6 or other internet protocol. This information may be obtained from the outer IP header of the A-type packet from which a B-type packet is obtained. The Ipv6 packet may also include payload data from the A-type packet.

Portions of the paths 206 labeled as "C" may convey "C-type" packets formatted as internet protocol packets including the same field definitions as the B-type packets but in which the SRH does not store information from the GTP header of an A-type packet and/or which are not subsequently converted to B-type packets using information in the SRH field. As shown in FIG. 2, packets sent from MEC server 118 to UE 102 may traverse the network 210 as B type packets whereas packets sent from UE 102 to the MEC server 118 traverse the network 210 as C-type packets Portions of the paths 206 labeled as "D" may convey "D-type" packets formatted as internet protocol packets including the inner IP header and payload data of a C-type packet from which the D-type packet was obtained. In particular, the D-type packet may include an IP packet as receive by the gNodeB 106 from the UE 102, from a MEC server 116, 118, or from the external network 214.

"Direct inbound packets" may be those passing through the gNodeB 106 that are not redirected, such as packets moving from left to right along the path 204 in FIG. 2. The direct inbound packets are transmitted from UE 102 to gNodeB. As received by gNodeB, the direct inbound packets may be D-type packets, e.g., IPv4 or IPv6. As output by the gNodeB 106, the direct inbound packets may be A-type packets transmitted by the gNodeB 106 to the translation module 208. In particular, the A-type packet may be a GTP packet encapsulating the IP packet received from the UE 102.

The translation module 208 converts the A-type direct inbound packets to B-type packets and transmits the B-type direct inbound packets over the network 210 to the UPF 112 using information included in the outer IP header of the A-type direct inbound packets. As noted above, information from the GTP field of an A-type packet may be included in the SRH' field of the B-type packet obtained from it in order to enable translation back into an A-type packet. However, the B-type packet itself may be an SRv6 packet rather than a GTP packet. The B-type packet further includes the inner IP header and payload data from the A-type packet.

The B-type direct inbound packets may be routed to the translation module 212, which converts the direct inbound packets from B-type packets back into A-type packets using information stored in the SRH' of the B-type packets. In particular, the data in the SRH' field of a B-type packet is used to generate a GTP header of a GTP packet including the inner IP field and payload data of the B-type packet, the GTP packet being the A-type direct inbound packet for the B-type direct inbound packet.

After conversion by translation module 212, the A-type direct inbound packets are transmitted to the UPF 112. The UPF 112 may then decapsulate the direct inbound packet to obtain the inner IP packet (e.g., a D-type packet received from UE 102) and forward the D-type direct inbound packets to the MEC server 116.

"Redirected inbound packets" may be those originating from the UE 102 as D-type packets and transmitted through gNodeB 106, but that are redirected away from the MEC server 116, such as to the external network 214 and/or another MEC server 118 or third party server. Redirected inbound packets may traverse path 206 from the upper left to the lower right in FIG. 2. As output by gNodeB 106, the redirected inbound packets may be A-type packets transmitted by the gNodeB 106 to the translation module 208. The translation module 208 converts the A-type redirected inbound packets to C-type packets such that the C-type redirected inbound packets do not include information from the GTP or UDP headers of the A-type redirected inbound packets. The translation module 208 transmits the C-type redirected inbound packets to the MEC server 118 to which the packets are redirected, such as by way of the routing module 216. The routing module 216 translates the C-type redirected inbound packets into D-type packets and sends the D-type redirected inbound packets to the MEC server 118. As noted above, translation may include decapsulating the D-type packet encapsulated in the C-type packet.

"Direct outbound packets" may be those passing through the UPF 112 and transmitted through the gNodeB to the UE 102 without being in response to a redirected inbound packet or part of the same network flow as a redirected inbound packet. For example, packets from the MEC server 116 may be transmitted by way of the UPF 112 as direct outbound packets. Direct outbound packets may traverse path 204 from right to left along the path 204 in FIG. 2. Packets received by the UPF 112 from MEC server 116 may be D-type packets. As output by the UPF 112, the direct outbound packets may be A-type packets encapsulating the D-type packets and transmitted by the UPF 112 to the translation module 212. The translation module 212 converts the A-type direct outbound packets to B-type packets and transmits the B-type direct outbound packets over the network 210 to the gNodeB 106 using information include in the IPv6 field of the B-type packets. Translation may include converting a GTP packet into an SRv6 packet that includes the data from the GTP header of the GTP packet in the SRH' field of the SRv6 packet, the SRv6 packet further including the inner IP header of the GTP packet and the payload data of the GTP packet.

The B-type direct outbound packets may be routed by translation module 212 to the translation module 208, which converts the B-type direct outbound packets back into A-type direct outbound packets using information stored in the SRH' of the B-type packets. This may include converting an SRv6 packet into a GTP packet encapsulating the inner IP header and payload data of the B-type packet and including the data from the SRH' field in the GTP header.

After conversion by translation module 208, the A-type direct outbound packets are transmitted to the gNodeB 106. The gNodeB 106 may then decapsulate the A-type packets to obtain D-type direct outbound packets and forward the D-type direct outbound packets to the UE 102. Decapsulation may include extracting the inner IP header and payload data from a GTP packet.

"Redirected outbound packets" may be those originating from the MEC server 118 or a location in the external network 214 to which the redirected inbound packets were routed. Redirected outbound packets may be transmitted in response to, or part of the same network flow as, redirected inbound packets. For example, redirected outbound packets may be transmitted by the MEC server 118 or third party server to the UE 102. Redirected outbound packets may traverse path 206 from the lower right to the upper left in FIG. 2. Redirected outbound packets may traverse a path to the translation module 208, such as by way of some or all of the external network 214, routing module 216, and network 210. As received by the routing module 216, redirected outbound packets may be D-type packets that are translated into B-type redirected outbound packets by the routing module 216 and the B-type redirected outbound packets are forwarded over the network 210 to the translation module 208. The translation may include encapsulating the inner IP header and payload data of an IP packet into a GTP packet.

The translation module 208 converts the B-type redirected outbound packets to A-type packets and transmits the A-type redirected outbound packets to the gNodeB 106. Translation from a B-type to A-type may include using information stored in the SRH' of the B-type packets. This may include converting an SRv6 packet into a GTP packet encapsulating the inner IP header and payload data of the B-type packet and including the data from the SRH' field in the GTP header. The gNodeB 106 may then decapsulate a D-type redirected outbound packet (inner IP header and payload data) from the B-type redirected outbound packet and transmit the D-type redirected outbound packet to the UE 102.

In some embodiments, user plane message are those used to establish and maintain a session between the UPF 112 and the UE 102. User plane messages may also include those transmitted by the UPF 112 to dictate routing of packets to and from the UE 102 and the MEC server 116 or redirection of packets to an external network 214. User plane messages may also convey 5G user plane message like echo request, echo reply, error indication, or other user plane messages.

Inbound user plane messages may be routed as direct inbound packets. User plane messages transmitted from the UPF 112 may be treated as direct outbound packets in every instance. Where redirection occurs as instructed by the UPF 112, subsequent inbound data packets, i.e. non-user plane messages packets, may be routed by the translation module 208 as redirected inbound packets in bypass of the UPF 112. The translation module 208 may identify user plane messages by performing deep packet inspection of the inbound packets. Systems and methods for performing this routing are described in detail below.

Figure 3:
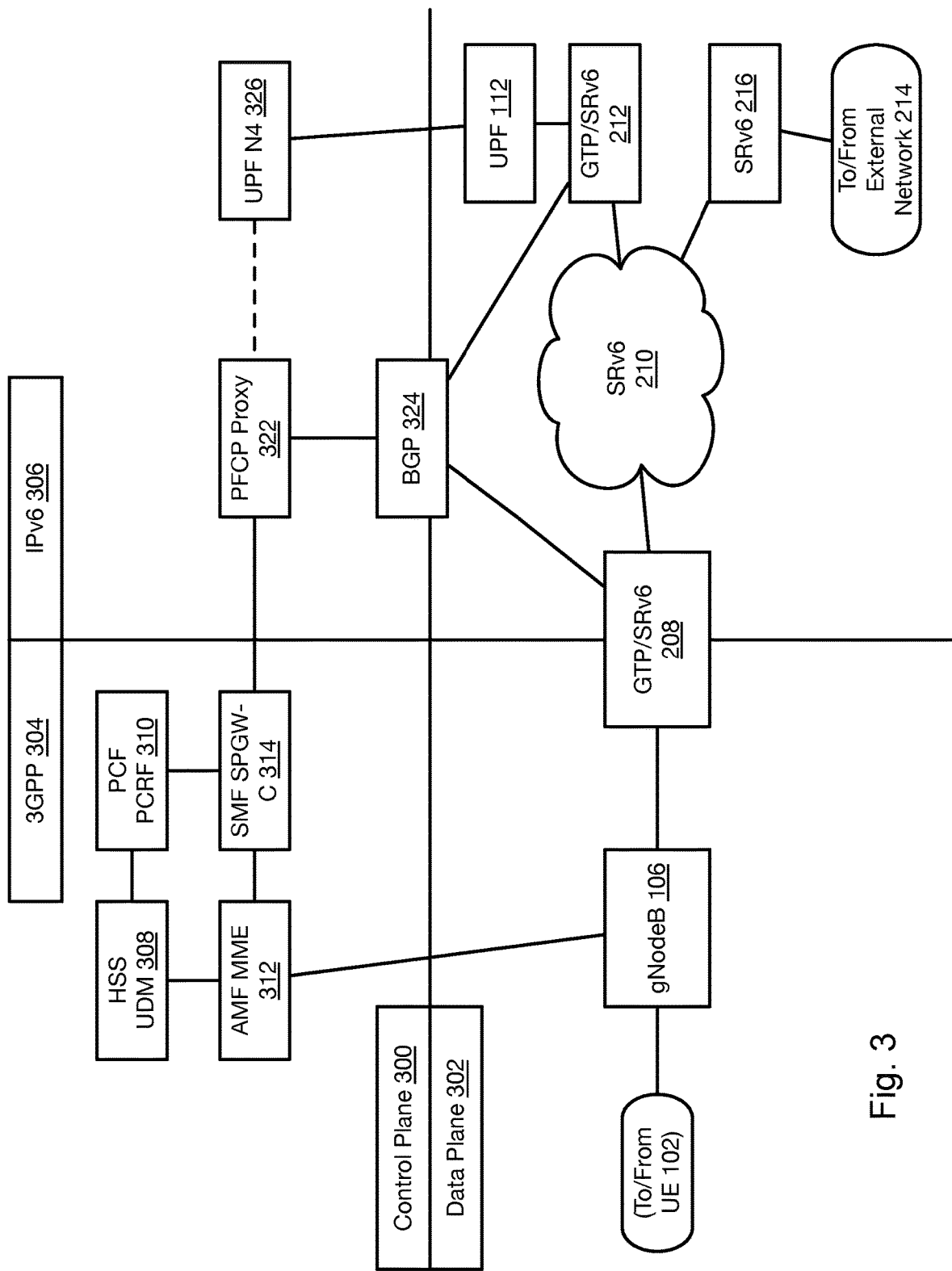
FIG. 3 is a schematic block diagram of components for performing routing of packets received over a cellular data communication network in accordance with an embodiment of the present invention.

Referring to FIG. 3, a network path between the UE 102 and an external network 214 may be understood with respect to a control plane 300 and a data plane 302. The control plane 300 includes modules and communication between modules that configure modules of the data plane 302 to transmit packets in a predetermined manner. The data plane 302 includes modules and communication between modules that transmits packets of payload data between the UE 102 and the external network 214. The modules of the control plane 300 and data plane 302 may be implemented within a single device, within multiple devices coupled to a common circuit board or chassis, or multiple devices connected to one another by one or more network connections. The illustrated components may execute on a server, cloud computing platform, or other location or be distributed across a combination of one or more of these.

The control plane 300 and data plane 302 may also be divided into portions 304 and 306. Portion 304 may be understood as conveying data packets according to protocols suitable for use in packet radio-type communication ("packet radio portion 304"), i.e. communication using GPRS, GTP, or other cellular data communication protocols. In the illustrated embodiment, portion 304 implements third-generation partnership project (3GPP) protocols for cellular data communication, though other cellular data communication protocols may also be used.

Portion 306 may be understood as conveying data packets according to an internet protocol, such as IPv6 protocol or other internet protocol that is not adapted for use in packet radio-type communication ("IP portion 306").

The control plane 300 of the packet radio portion 304 may include such components as:
  Home Subscriber Server with Unified Data Management (HSS UDM) 308 or other component for managing some or all of authentication, handover, IP Multimedia Subsystems (IMS), and simple message service (SMS).
  Policy control function (PCF) and/or Policy and charging rules function (PCRF) 310 for managing access to a cellular data communication network according to user subscriptions.
  Access and Mobility Management Function (AMF) and/or Mobility Management Entity (MME) 312 or other component for managing connection and mobility management tasks (e.g., handovers).
  Session Management Function (SMF) and/or Serving and Packet Gateway (SPGW, such as SPGW-C) 312 (also referred to herein as "SMF 314") or other component for managing user sessions with the UPF and for facilitating interfacing of a packet radio network with an internet protocol network.

The SMF 314 may manage GTP session information and provide this to the AMF 312. The AMF 312 may program components in the data plane 302 (gNodeB 106 as described below) to route packets according to the GTP session information.

The data plane 302 of the packet radio portion 304 may include such components as:
  gNodeB 106 or other hardware component that communicates directly with the UE 102 by way of an antenna and which encapsulates packets from the UE 102 into GTP packets and may also implement user plane control protocols.

The translation module 208 for converting packets back and forth between GTP and SRv6 when traversing between the packet radio portion 304 and the IP portion 306.

The control plane 300 of the IP portion 306 may include such components as:

A packet forwarding control protocol (PFCP) proxy 322 described in greater detail below.

A border gateway protocol (BGP) module 324 or other component for receiving and/or transmitting routing paths to other components shown in FIG. 3 and/or other devices of any of the networks described herein.

The user plane function control module (UPF N4) 326 or other component for terminating GTP connections and managing transmission of packets between a packet radio network and an internet protocol network. UPF N4 326 facilitates setting up sessions with the UPF 112.

The data plane 302 of the IP portion 306 may include such components as:

The UPF 112 as described above.

The translation module 208, which operates in both portions 304 and 306.

The network 210.

The routing module 216.

A translation module 212 for translating traffic sent to the UPF 112 as described above.

In the illustrated implementation, packet forwarding associations according to PFCP may be coordinated between the SMF 314 and the UPF control module 326 by way of the PFCP proxy 322. The SMF 314 and UPF control module 326 may therefore exchange session information by way of the PFCP proxy 322. The PFCP proxy 322 may snoop this information and provide it to the BGP module 324. Accordingly, the PFCP proxy 322 may make an association with the PFCP implementation of the UPF control module 326 and an association with the SMF 314. The BGP module 324 may use snooped information to program the data plane 302 (e.g., translation modules 208, 212, routing module 216) to perform translations from GTP to an IP protocol (e.g., SRv6) and from the IP protocol to GTP using the information snooped by the PFCP proxy 322 as described herein below.

Existing software packages implementing PFCP are proprietary and not readily changed. Some open source software packages for implementing PFCP are available but exist only as packages that must be incorporated into an application. In addition, the network stack of the UPF control module 326 may be implemented by third party or open source software that is not readily modifiable (e.g. upg-vpp (user plane gateway vector packet processor)).

In some embodiments, the PFCP proxy 322, BGP module 324, and internal routing module 216 may be modified relative to conventional implementations of such components in order to perform some or all of:

Establish associations between SMF 314 and the PFCP implementation of the UPF control module (UPF N4) 326.

Transfer messages between the SMF 314 and the PFCP implementation of the UPF control module 326.

Snoop session messages for the BGP module 324 to obtain such information as address of the UE 102, remote/local tunnel endpoint (TEP) addresses, tunnel endpoint identifier (TED), and other information.

Figure 4:
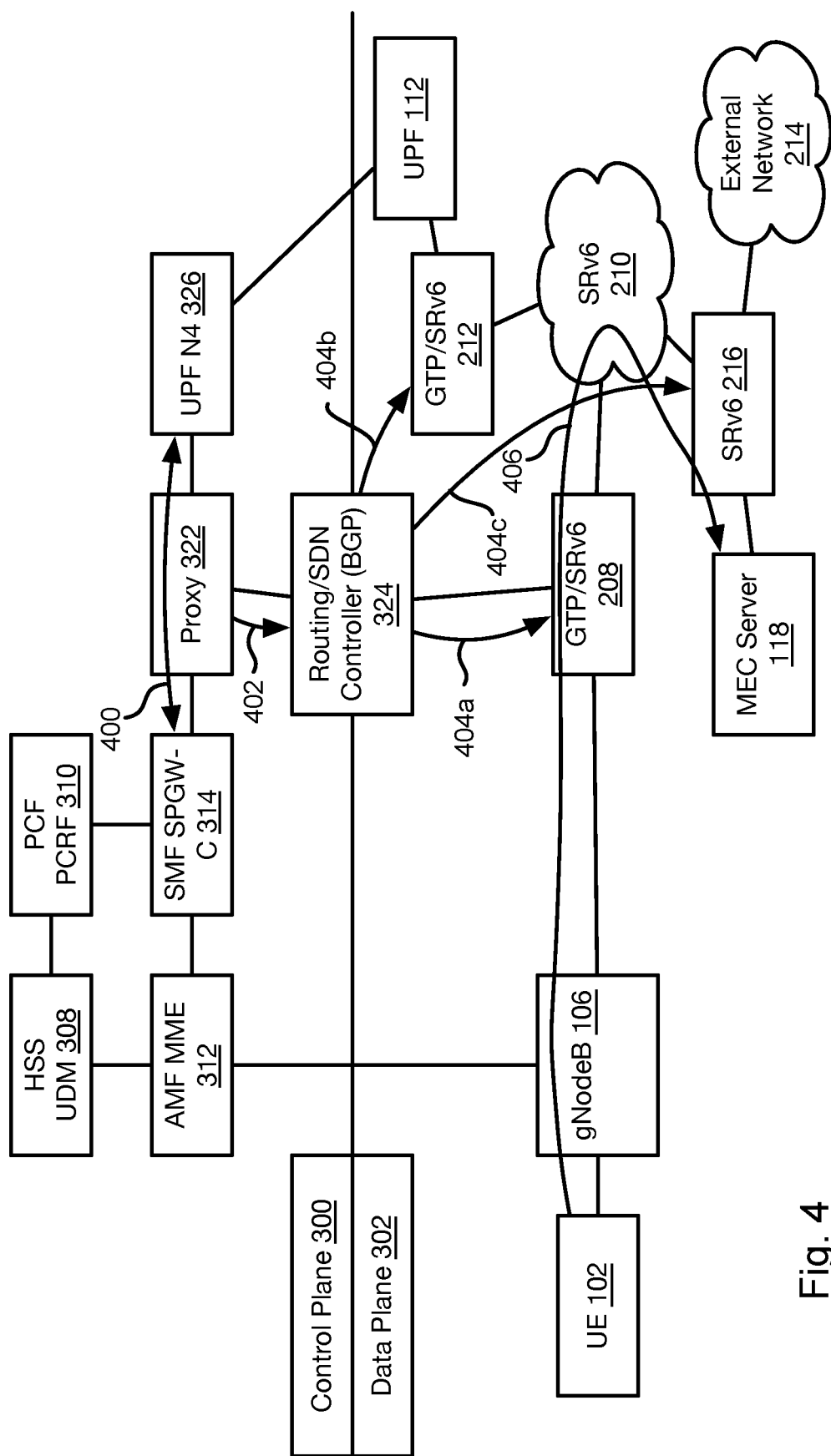
FIG. 4 is a schematic block diagram illustrating the snooping of information by a PFCP proxy and the programming of translation and routing modules using this information in accordance with an embodiment of the present invention.

FIG. 4 further illustrates an example implementation of the PFCP proxy 322 and BGP module 324. In a conventional 5G mobile network, an association, e.g., control channel, will be set up between the AMF MME 312 and the UPF N4 326. A session, e.g., user plane information, will be established between the SMF SPGW 314 and the UPF N4 326. Once a session is established between the SMF SPGW 314 and the UPF N4 326, the UE 102 may commence sending payload traffic. Subsequently, gNodeB 106 may encapsulate packets from the UE 102 into GTP packets and forward the GTP packets to the UPF 112. In a typical 5G implementation, association and session requests are sent to UDP port 8805 of the UPF N4 326 and responses to the requests from the UPF N4 326 will be sent to the source UDP port from which the requests were received.

In a conventional system, it is difficult to optimize the path between gNodeB 106 and the UPF 112 for the reasons noted above: all UE traffic must be encapsulated into GTP packets and forwarded through the UPF 112.

In some embodiments, limitations of a conventional 5G mobile network are overcome by interposing the PFCP proxy 322 between the SMF SPGW 314 and the UPF N4 326 such that the PFCP proxy 322 forwards 400 traffic between these components. The PFCP proxy 322 therefore receives PFCP messages from the SMF SPGW 314 and forwards them to the UPF N4 326. Likewise, the PFCP proxy 322 receives PFCP messages from the UPF N4 326 and forwards them to the SMF SPGW 314. As it does so, the PFCP proxy 322 may parse the PFCP messages in both directions to retrieve user plane information.

The PFCP proxy 322 may then provide 402 the user plane information to a routing/software defined network (SDN) controller running outside of the PFCP proxy 322. In the illustrated embodiment, the routing/SDN controller is implemented using the BGP module 324, though other implementations may also be used. The PFCP proxy 322 and routing/SDN controller 324 may execute on a same computing device or separate computing devices. The PFCP proxy and routing/SDN controller 324 may achieve the routing as described above with respect to FIG. 2 without further modification of the control plane 300, particularly the SMF SPGW-C 314 and UPF N4 326. In particular, the SMF SPGW-C 314 and UPF N4 326 may exchange information to establish a 5G session by way of the PFCP proxy 322 such that operation of the PFCP proxy 322 is not perceptible by the SMF SPGW-C 314 and UPF N4 326.

The BGP module 324 may program 404a the translation module 208 in the data plane according to the user plane information. The translation module 208 may then forward 406 redirected packets to the target of the redirection, such as the MEC server 118 or external network 214 according to a path received from the BGP module 324 in bypass of the UPF 112, the path being more optimized relative to the conventional approach in which packets are first routed through the UPF 112. The BGP module 324 may also program 404b the translation module 212 to route control packets to the UPF 112 and program 404c the routing module 216 to route packets to and from the MEC server 118 or other device connected to routing module 216 by the external network 214.

With respect to the programming 404a, the BGP module 324 provides a route toward the UPF 112 to the translation module 208 and also provides a rule about how to translate a GTP packet into an SRv6 packet, i.e. an A-type packet into a B-type packet as described above. Accordingly, when the translation module 208 receives a GTP packet whose destination is the UPF 112, the translation module 208 will apply the rule received from the BGP module 324 to perform the translation.

With respect to the programming 404b, the BGP module 324 may provide a similar or identical rule to the translation module 212. Based on this rule, the translation module 212 can translate SRv6 packets to GTP packets and recreate the original GTP packet which was sent out to the UPF 112. The BGP module 212 may also provide to the translation module 212 a route toward the gNodeB 106. When the UPF 112 sends out GTP packet whose destination is the gNodeB 106, the translation module 212 can translate GTP packets to SRv6 packets based on the above rule and then forward the resulting SRv6 packets to the translation module 208. The translation module 208 can translate the SRv6 packets back into GTP packets based on the same rule and forward the resulting GTP packets to the gNodeB 106.

For packets sent by UE 102 toward the external network 214 or external MEC server 118, the routing module 216 may announce to the translation module 208 an external route to the external MEC server 118 and/or external routing module 214. This may be done based on the standard L3 VPN SRv6 manner. Accordingly, the translation module 208 can execute the standard SRv6 encapsulation based on the inner packet generated by UE.

With respect to the programming 404c, the routing module 216 may implement a standard SRv6 router that may lack the capability to process GTP packets. Accordingly, programming 404c may include generating, by the BGP module 324, a special service SID for SRv6 that contains GTP information (e.g., some or all of the GTP information that could be embedded in an SRH' header of a B-type packet). As noted above, redirected inbound packets traversing the network 210 may be formatted as B-type packets. Accordingly, the programming 404c may program the routing module 216 to populate add GTP information to the SRH' field of the Srv6 header encapsulating each packet received from the MEC server 118 or external network 214 and addressed to the gNodeB 106.

For responses received from the external network 214 or external MEC 118 and directed to the UE 102, the routing module 216 may encapsulate the response packet (an IP packet, such as IPv4 or IPv6) into SRv6 packets. At this time, the routing module 216 may use the special service SID which was provided by BGP 324. This SID contains the required GTP information that can be included in the SRH' header. Hence, the translation module 208 can translates SRv6 packets to GTP packets and send the resulting GTP packets to the gNodeB 106.

Figure 5:
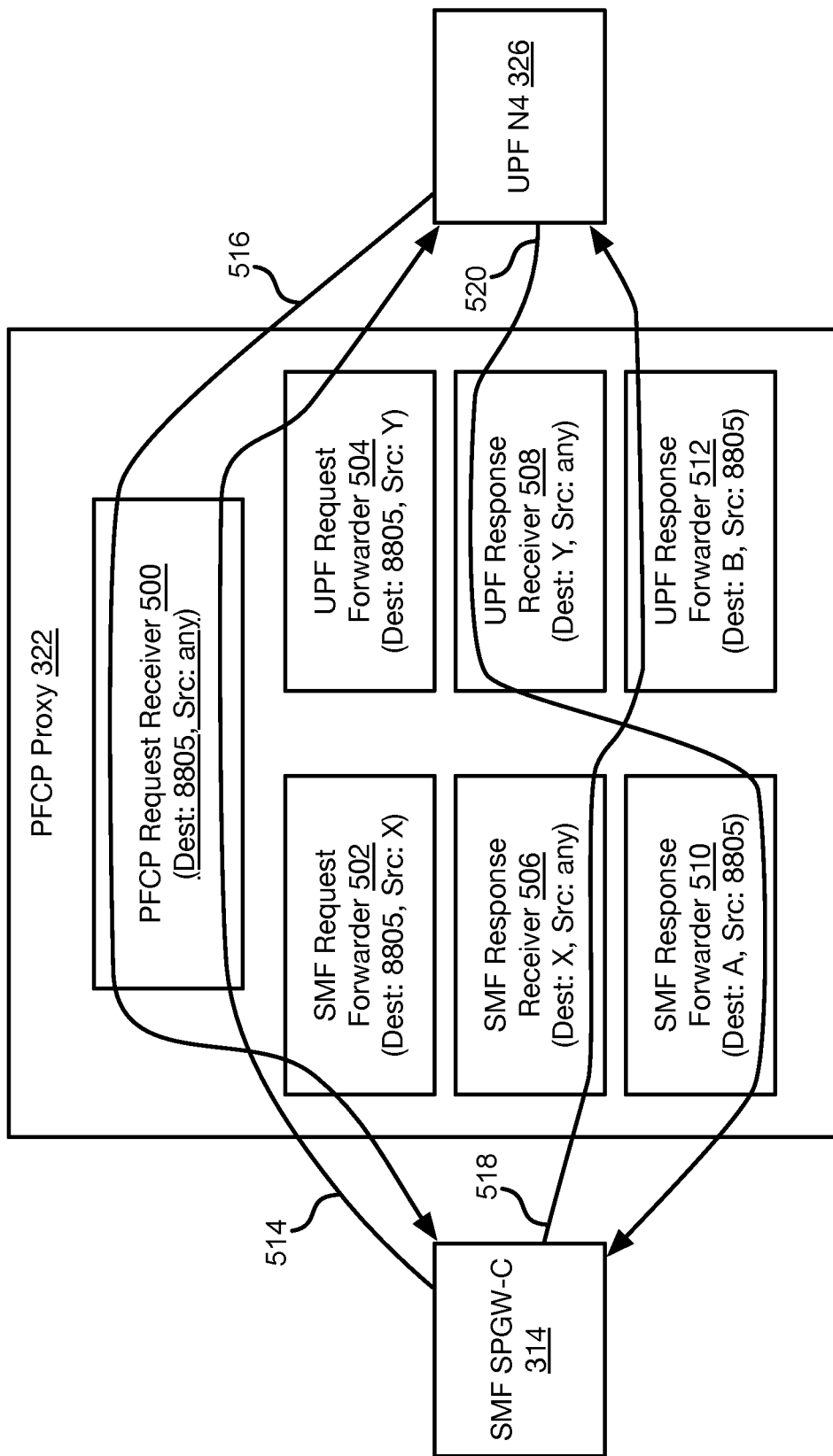
FIG. 5 is a schematic block diagram of a PFCP proxy in accordance with an embodiment of the present invention.

FIG. 5 illustrates an example implementation of the PFCP proxy 322. The PFCP proxy 322 may parse PFCP messages order to retrieve 5G session information and process the messages as outlined below and forward the PFCP messages to their destinations. In some embodiment, the go-pfcp package is used to parse PFCP messages. For example in the illustrated embodiment, the PFCP proxy 322 includes a PFCP request receiver 500, SMF request forwarder 502, UPF request forwarder 504, SMF response receiver 506, UPF response receiver 508, SMF response forwarder 510, and UPF response forwarder 512. Each of these components may be assigned to either listen to or transmit from a particular port of the PFCP proxy 322. The operation of each component is described below.

When forwarding PFCP messages to the UPF N4 326, the PFCP proxy 322 may rewrite the IP source address of the forwarded message with the PFCP Proxy's address and rewrite the IP destination address as that of the UPF N4 326. The PFCP proxy 322 may rewrite the UDP source port of the forwarded request to be the PFCP Proxy's port number. The PFCP request as rewritten by the PFCP proxy 322 may then be sent to the UPF N4 326.

When forwarding PFCP messages to the SMF SPGW-C 314, the PFCP proxy 322 rewrites the IP source address to the PFCP proxy's address, rewrites the IP destination address with that of the SMF SPGW-C 314, and rewrites the UDP source port to the PFCP proxy's local port number. Then PFCP proxy sends out PFCP response as rewritten to the SMF SPGW-C 314.

By rewriting messages 514, 516 in this manner, the SMF SPGW-C 314 and UPF N4 326 are communicating with the PFCP proxy 322. However, the PFCP proxy 322 can overwrite IP source/destination addresses and UDP source port such that MF SPGW-C 314 and UPF N4 326 cannot recognize the PFCP proxy 322 at all.

The PFCP proxy 322 intercepts the PFCP messages by listening to UDP port 8805. UDP port 8805 is the port defined by 3GPP for receiving PFCP messages. Accordingly, a different port may be substituted for UDP port 8805 throughout the following description when a different configuration is used. The operation of the components of the PFCP proxy 322 may be as follows:

The PFCP request receiver 500 listens for PFCP request messages 514, 516 addressed to UDP port 8805 from the SMF SPGW-C 314 or UPF N4 326, i.e. the port allocated for receiving PFCP messages, and records the source port of the PFCP request 514 from the SMF SPGW-C 314 (port A in the illustrated example). The PFCP request receiver 500 may further record the source port of the PFCP request 516 from the UPF N4 326 (port B in the illustrated example). The source ports for the messages 514, 516 may be preconfigured (Port X and Y, respectively).

The SMF request forwarder 502 forwards the request 516 to the SMF SPGW-C 314. The SMF request forwarder 502 is configured by PFCP request receiver 500 to use X as the source port for the forwarded request 516 transmitted to SMF SPGW-C 314 by SMF request forwarder 502. The SMF request forwarder 502 further modifies the forwarded request 516 by rewriting the IP destination address as the IP address of the SMF-SPGW-C 314 and rewriting the IP source address as the IP address of the PFCP proxy 322.

The UPF request forwarder 504 forwards the request 514 to the UPF N4 326. The UPF request forwarder 504 is configured by PFCP request receiver 500 to use Y as the source port for the forwarded request 516 transmitted to UPF N4 326 by the UPF request forwarder 504. The UPF request forwarder 504 further modifies the forwarded request 514 by rewriting the IP destination address as the IP address of the UPF N4 326 and rewriting the IP source address as the IP address of the PFCP proxy 322.

The SMF response receiver 506 is configured to detect a PFCP responses 518 from SMF SPGW-C 314 addressed to port X and to provide detected PFCP responses 518 to the UPF response forwarder 512.

The UPF response receiver 508 is configured to detect PFCP responses 520 from UPF N4 326 addressed to port Y and to provide detected PFCP responses 520 to the SMF response forwarder 510.

The SMF response forwarder 510 is programmed to forward PFCP responses 518 to SMF SPGW-C 314 with a source of the forwarded PFCP responses 518 set to UDP port 8805 and the destination set to port A (the previously recorded source port of the request 514). The SMF response forwarder 510 further modifies the forwarded response 518 by rewriting the IP destination address as the IP address of the SMF SPGW-C 314 and rewriting the IP source address as the IP address of the PFCP proxy 322.

The UPF response forwarder 512 is programmed to forward PFCP responses 520 to port Y of UPF N4 326 with a source of the forwarded PFCP responses 520 set to UDP port 8805 and the destination set to port B (the previously recorded source port of the request 516). The UPF response forwarder 512 further modifies the forwarded response 518 by rewriting the IP destination address as the IP address of the UPF N4 326 and rewriting the IP source address as the IP address of the PFCP proxy 322.

Figure 6:
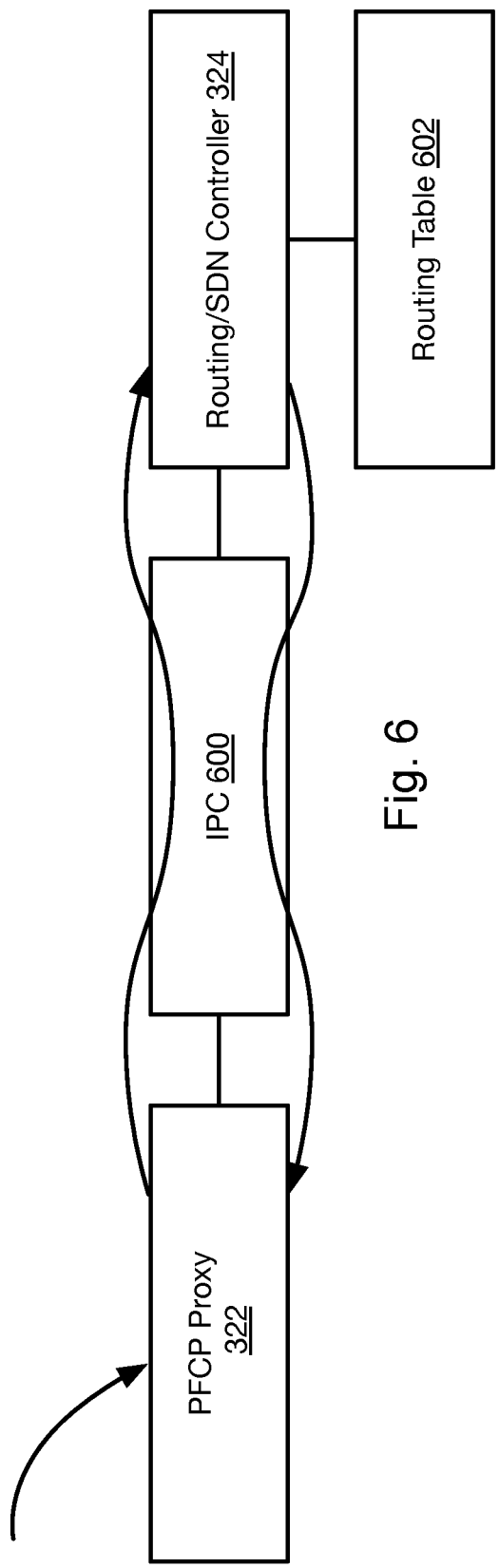
FIG. 6 is a schematic block diagram illustrating the exchange of information between the PFCP proxy and a routing/SDN controller in accordance with an embodiment of the present invention.

Referring to FIG. 6, as the PFCP proxy 322 forwards messages as outlined above with respect to FIG. 4, the PFCP proxy 322 may also be snooping information about the associations and sessions being created using the messages. This snooped information may then be provided to the routing/SDN controller 324 (BGP module 324). In the illustrated embodiment, the transfer of information between the PFCP proxy 322 and routing/SDN controller 324 is performed using inter-process communication (IPC) 600. For example gRPC (an open source remote procedure call (RPC) system). The SDN controller 324 may program a routing table 602 according to the snooped information.

The snooped information may include some or all of:
Remote Tunnel Endpoint (TEP), e.g., the address of the UPF 112
Local TEP, e.g., the address of the gNodeB 106
Tunnel Endpoint Identifier (TEID)
QFI (quality of service (QoS) flow identifier)
UE Address (address of UE 102)
Access Network Instance
Core Network Instance Upon receiving this information the routing/SDN controller 324 may then generate a router entry in the routing table 602 based on this information. These routing entries may be used to control routing of the translation modules 208, 212 and possibly the routing module 216 in order to implement the routing described above with respect to FIGS. 2 and 4.

Referring again to FIG. 2, a desired routing may include receiving an inner IP packet from the UE 102 by the gNodeB 106, which generates an A-type (GTP) packet including the inner IP packet. The gNodeB 106 transmits the A-type packet to the UPF 112 over a GTP tunnel between the gNodeB 106 and the UPF 112. The parameters defining this GTP tunnel are included in the above-listed snooped information, particularly the remote TEP that references the UPF 112 and the local TEP that references the gNodeB 106.

As described above with respect to FIG. 2, rather than simply routing the A-type packets through the GTP tunnel, the A-type packets are converted to B- or C-type packets and routed over an IP network 210, such as an SRv6 network 210. Transitions between the IP network 210 and the GTP tunnel are managed by the translation modules 208, 212. Additionally, the routing module 216 may also need to route packets with reference to the parameters defining the GTP tunnel. The snooped information obtained by the PFCP proxy 322 may be provided to the routing/SDN controller 324. The routing/SDN controller 324 may then program the translations modules 208, 212 and the routing module 216 to achieve the routing described with respect to FIG. 2. Various examples of how the translation modules 208, 212 and routing module 216 may be programmed by the routing/SDN controller 324 are described below.

In a first example, the routing/SDN controller 324 receives the remote TEP and generates and distributes a route toward the UPF 112. In particular, this route may be provided to the translation module 208. The route may be provided in addition to the programming 404*a* as described above for performing translation between GTP and SRv6.

In a second example, the routing/SDN controller 324 receives the local TEP and UE address and generates and distributes a service SID based on this information according to SRv6. In particular, the service SID may be provided to the routing module 216. The service SID advertises a route to the UE 102 over the network 210 by way of the gNodeB 106 referenced by the local TEP. The QFI may be used by the routing/SDN controller 324 when generating the service SID. This second example may be implemented when performing programming 404*c* as described above.

In a third example, the gNodeB 106 may send out A-type (GTP) packets within the GTP tunnel established with the UPF 112 by setting the destination of the A-type packets to be the remote TEP (tunnel endpoint address of UPF 112). The PFCP proxy 322 obtains this remote TEP address by snooping control packets between the gNodeB 106 and UPF 112 when setting up the GTP tunnel. The PFCP proxy 322 may give the remote TEP address to the routing/SDN controller 324.

The routing/SDN controller 324 may then generate a routing entry for this remote TEP and program the translation module 208 with this routing entry. In some embodiments, the routing/SDN controller 324 may use a function such as GTP4.D to generate the routing entry. The routing entry may define the translation from A-type to B-type packet, including the encoding of GTP header information into the SRH' header, and define routing through the network 210 to the translation module 212, such as in the form of one or more SIDs according to a segment routing protocol, such as SRv6.

In a fourth example, the routing of traffic from ingress premise equipment (PE) to egress PE is managed based on the snooped information as described below. The ingress PE may, for example, be the translation module 208 whereas the egress PE is the routing module 216 for interfacing with the external network 214 or the MEC server 118. In the reverse direction, the routing module 216 is the ingress PE and the translation module 208 is the egress PE.

In a standard virtual private network (VPN), such as L3VPN SRv6, the ingress PE sends out an SRv6 packet whose inner packet is a packet received from an IP network. The destination address of the SRv6 packet may be set to an IP address, such as an IPv6 address (e.g., segment identifier (SID)), that is assigned to the egress PE. The egress PE receives the SRv6 packet, decapsulates the inner packet, and forwards the inner packet to a destination address of the inner packet. In the illustrated example, the destination address of the inner packet may be in the form of an IPv6 destination (e.g., SID). The egress PE may therefore determine where to forward the inner packet based on the destination address of the inner packet, which may be a third party server or the UE 102 depending on the direction the packet is moving through the network 210.

In the illustrated embodiment, the egress PE (e.g., translation module 208) may need to determine the gNodeB 106 of a set of available gNodeB instances to which the inner packet should be forwarded to in order to reach a particular UE 102. The egress PE may therefore receive a routing entry from the routing/SDN controller 324 that maps an IP address of the UE 102 to the local TEP of the gNodeB 106 to which that UE 102 is connected (e.g., has a TCP or other session established). The association between the IP address of the UE 102 and the local TEP may be determined from the snooped information listed above.

The routing entry may instruct the egress PE to use the local TEP of the gNodeB 106 when performing translation of a packet from a C-type packet to an A-type packet and transmitting the resulting A-type packet over a GTP connection to the gNodeB 106. For example, where GTP4.D (IPv4 GTP) is used, the routing/SDN controller 324 may provide the following IPv6 address to the egress PE:

SRv6 Locator (<56 bit)+TED (32 bit)+QFI (8 bit)+Local TEP address (32 bit)

The "SRv6 Locator" may reference a configuration on the routing/SDN controller 324. Based on the SRv6 locator, the translation modules 208, 212 can recognize the translation function they are to perform. For example, BGP 324 may assign 2001:db8::/48 as the SRv6 locator for translation between GTP and SRv6. In this case, when a translation module 208, 212 generates an SRv6 packet from a GTP packet, it will use 2001:db8::/48 as the SRv6 locator and embed the TEID, QFI, TEP address of the GTP packet in the SRH' field. When a translation module 208, 212 receives a SRv6 packet whose destination matches 2001:db8::/48, the translation module 208,212 can understand that the SRv6 packet needs to be translated to GTP. The translation module 208, 212 can obtain TEID, QFI, TEP address from the SRH' field and then regenerate the original GTP packet. The GTP packet can then be sent to whichever of the UPF 112 or gNodeB 106 to which it is addressed.

For multipath label switching (MPLS) in a L3VPN, the SRv6 locator may be used to specify a given VPN. In the case of SRv6 L3VPN, the SRv6 locator may specify the service SID (IPv6 address format) and may be used to specify a given VPN instead of the label for MPLS L3 VPN.

The local TEP address may be embedded in the above IPv6 address. This address may also be announced to the ingress PE as the service SID. When the egress PE receives a packet, whose destination matches this IPv6 address, the egress PE determines which gNodeB instance to forward the packet to and can also obtain the local TEP address of the BBU and generate a GTP packet (A-type packet) for transmitting to the gNodeB instance. The routing/SDN controller 324 may program the egress PE with a routing rule, such as a GTP4.D routing rule that instructs the egress PE how to perform the translation to a GTP packet from the IPv6 address.

In order to translate from SRv6 to GTP, the egress PE may use the following information: the local TEP address (address of the gNodeB 106), TED (Tunnel identifier), and QFI (QoS Identifier). The local TEP address is the destination address of GTP packet. TEID and QFI are values that need to be embedded in GTP header. This information may therefore be embedded in the IPv6 destination address (see example address above) of packets routed from the ingress PE to the egress PE to facilitate translating from SRv6 to GTP is carried in IPv6 destination address.

This information (local TEP address, TEID, QFI) are obtained by the PFCP proxy 322, provided to the routing/SDN controller 324, and then used by the routing/SDN controller 324 to program the ingress PE and egress PE to embed the information and perform translations using the information as described above. The routing/SDN controller 324 may do so by announcing VPNv4/v6 routes with the IPv6 address included the embedded information as the service SID provided to the ingress PE. The routing/SDN controller 324 may also program this information in the egress PE in the form of an SRv6 locator created using the GTP4.E function.

When the ingress PE receives a packet from an IP network, the ingress PE may encapsulate the packet from the IP network with SRv6. At this time, the outer IPv6 destination address is the above service SID including the embedded information. When the egress PE receives the packet with the outer IPv6 destination matched to the above service SID, the egress PE can determine to execute the GTP4.E function on the received packet to translate it to a GTP (A-type) packet using the TED, QFI and local TEP embedded in the IPv6 destination address In a fifth example, the routing module 216 may receive packets from the external network 214 that are addressed to the IP address of the UE 102. The snooped information provides an association to the local TEP of the gNodeB 106. The routing/SDN controller 324 may therefore announce a route to the routing module 216 that directs the routing module 216 to route traffic addressed to the IP address of the UE 102 to the gNodeB 106. The packet may then be routed by the routing module 216 to the UE 102 by way of the gNodeB 106 according to the path 206 of FIG. 2 with translations between D, C, and A type packets as described above.

In a sixth example, the snooped information may include a core network instance. This value may be used for the network slicing in a 5G core network. Based on this value, the routing/SDN controller 324 may determine from which virtual routing and forwarding (VRF) table a UE address should be imported and which VPN (VRF) to use when generating a route to the UE 102 when performing the programming 404c. The access network instance in the snooped information may be used to filter out a specific UE address from a given VRF table. Accordingly, the routing/SDN controller 324 may specify an import and/or filter rule based on the core network instance and access network instance specified in the snooped information.

Figure 7A:
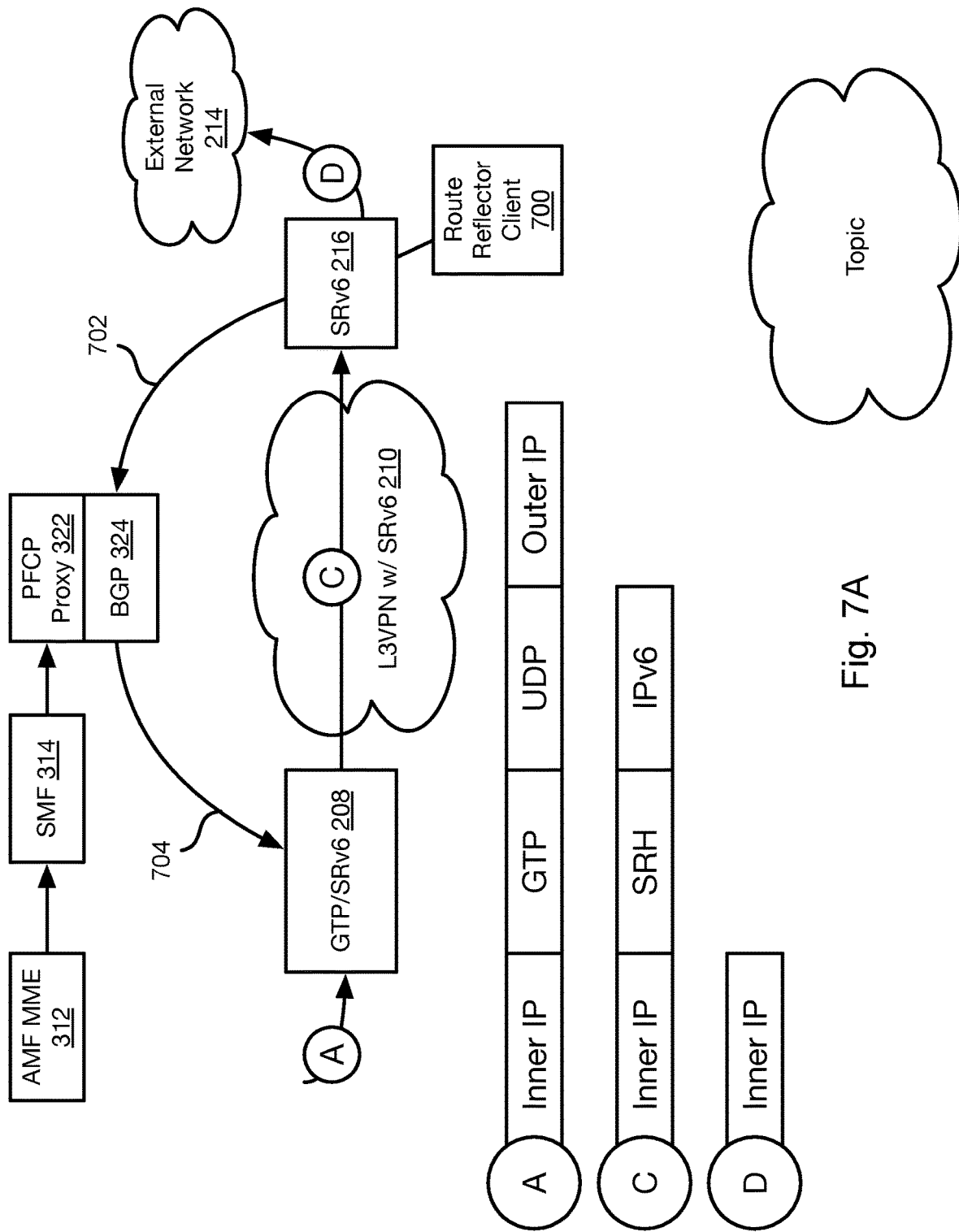
FIG. 7A is a schematic block diagram illustrating propagating external routing information to a translation module in accordance with an embodiment of the present invention.
Figure 7B:
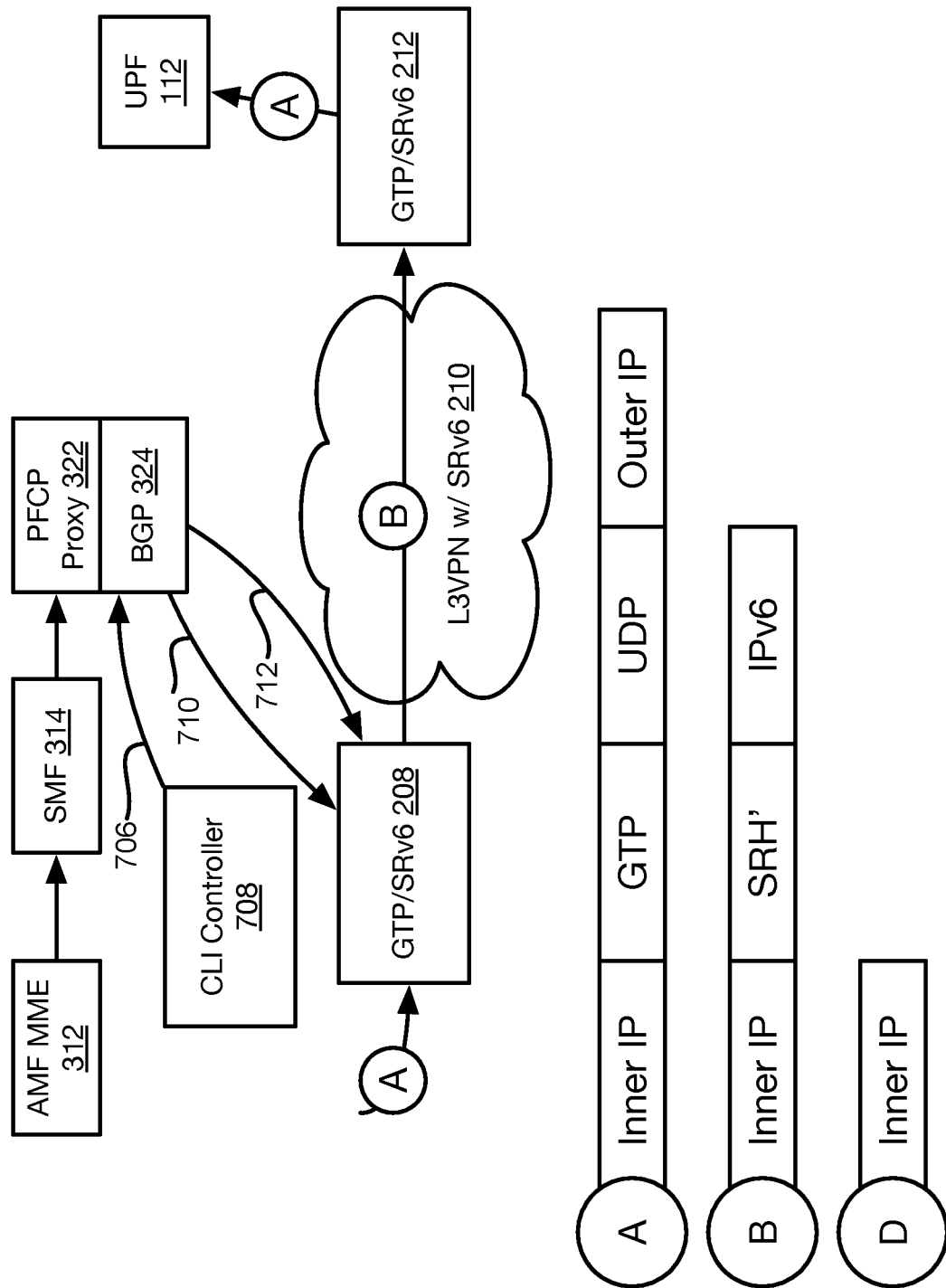
FIG. 7B is a schematic block diagram illustrating the programming of a translation module to route packets to an external network in accordance with an embodiment of the present invention.
Figure 7C:
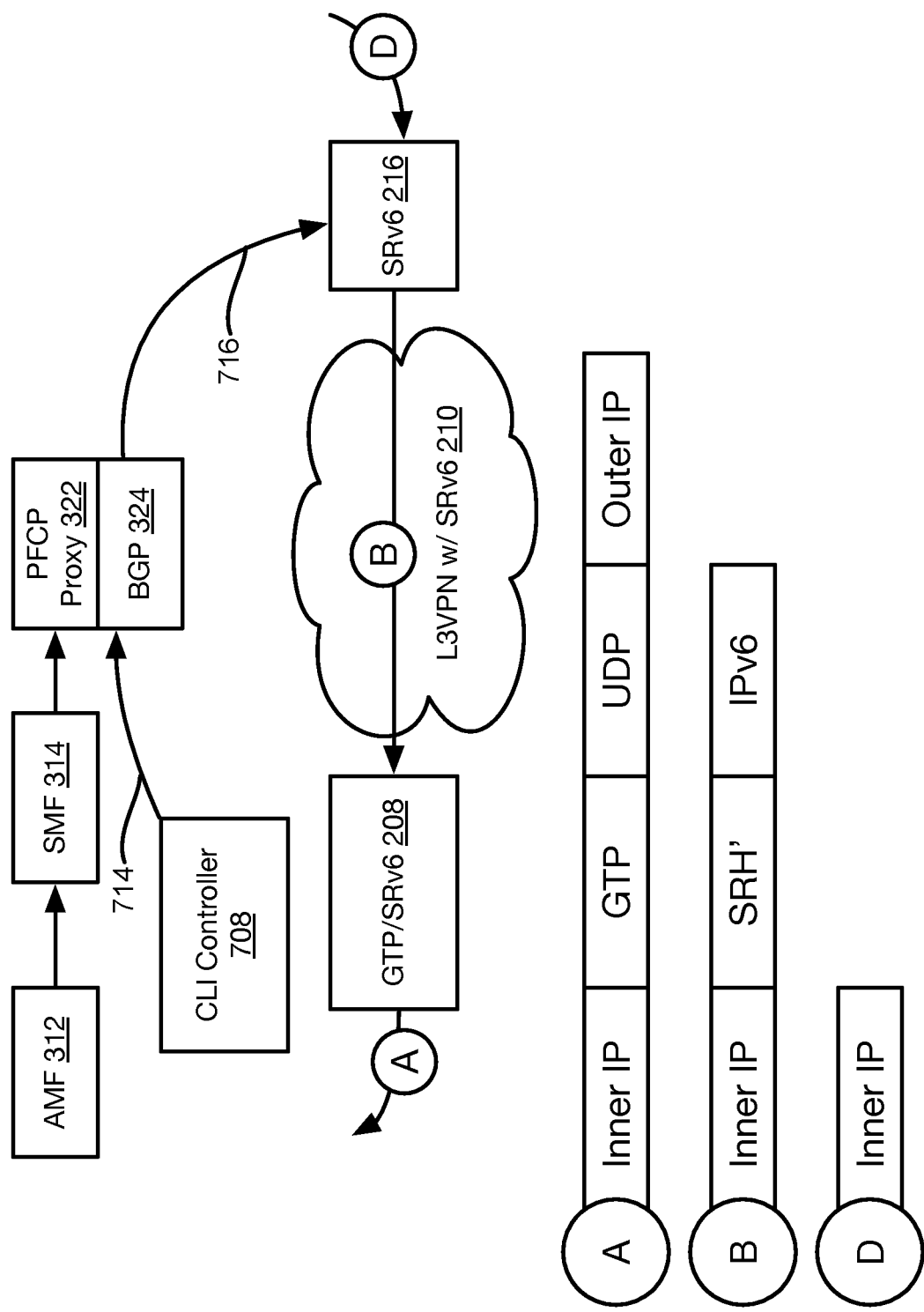
FIG. 7C is a schematic block diagram illustrating programming of a routing module to route packets to an external network in accordance with an embodiment of the present invention.
Figure 7D:
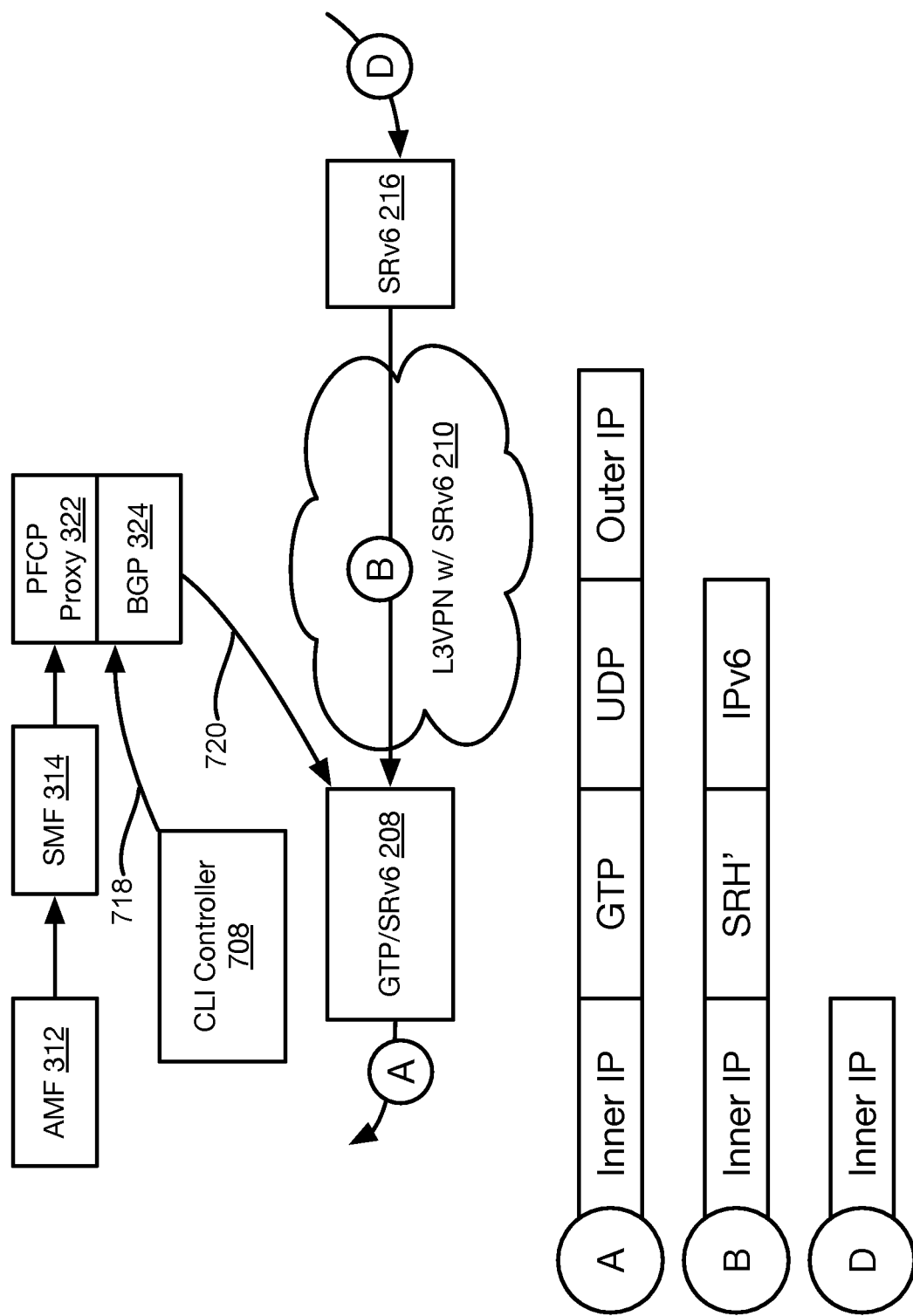
FIG. 7D is a schematic block diagram illustrating programming of a translation module to route packets to an external network in accordance with an embodiment of the present invention.
Figure 8:
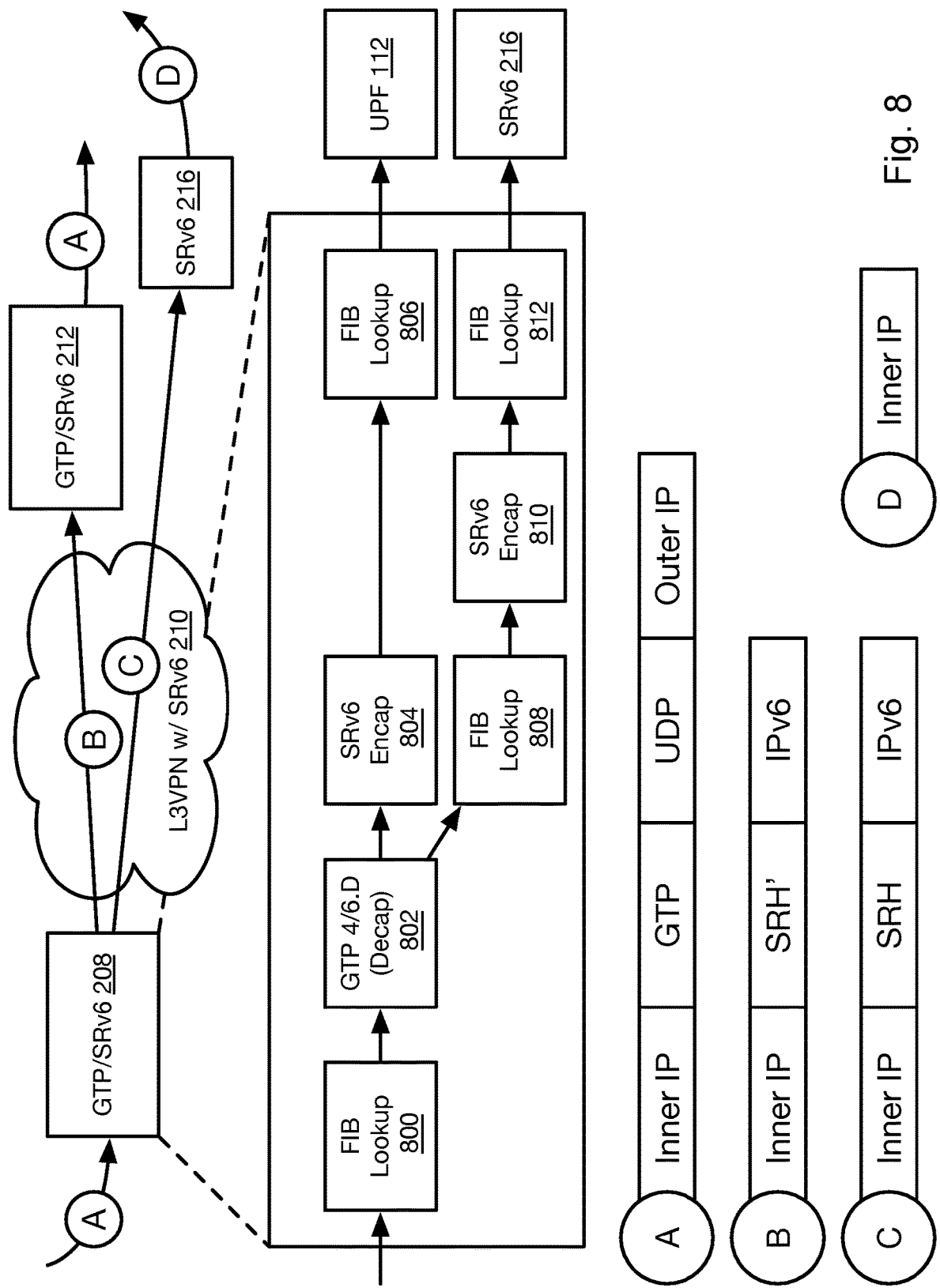
FIG. 8 is a schematic block diagram illustrating configuration of a translation module in accordance with an embodiment of the present invention.

Referring to FIGS. 7A to 8, the translation module 208 manages the translation of packets from SRv6 to GTP. In a typical 5G network, a GTP packet is received by UPF 112 from gNodeB 106, an inner IP packet is obtained from the GTP packet by the UPF 112, and the inner IP packet is subsequently processed by a SRv6 component to manage routing of the inner IP packet according to SRv6, which may include using routing according to a virtual routing function (VRF). The SRv6 component may be the target of inbound packets addressed to the UE 102 and manages routing according to SRv6 and forwards received packets to the UPF 112 for encapsulation into GTP packets and forwarding to gNodeB 106.

In the approach described herein, packets are routed to and from the translation module 208 over an SRv6 network 210 and an external network 214. Accordingly, the translation module 208 may also manage routing of packets according to SRv6, including managing VRFs.

The approach described herein makes reference to SRv6. However, it may also be implemented using labels according to multi-protocol label switching (MPLS).

Referring specifically to FIG. 7A, the routing module 216 may include or function as a route reflector client 700, such as a BGP route reflector client. The BGP module 324 (also referred to herein as the routing/SDN controller 324) may function as a route reflector and receive 702 routing information broadcast by the route reflector client 700. The BGP module 324 may then reflect 704 this routing information to the translation module 208, such as by performing standard route reflector functions. In some embodiments, routing module 216 sends, to the BGP 324, a VPNv4/v6 update for an external route, i.e. a route to an external IP address in the external network 214. BGP 324, working as a route reflector with the routing module 216 as a client, reflects the VPNv4/ v6 update from routing module 216 to the translation module 208. Based on this, translation module 208 can get the route to the external network 214 via routing module 216.

For example, the routing module 216 may update routes, such as VPNv4/v6 routes with a service SID. The routes may describe routing with respect to the external network 214 and the service SID may instruct performance of a segment including performing VPNv4/v6 functions with respect to packets labeled with that service SID. A route may specify the routing module 216 as a nexthop for one or more addresses in the external network 214 or provide an SR policy instructing adding of a prefix SID to packets including the one or more addresses, the prefix SID referencing a segment instructing routing of packets to the routing module 216. Accordingly, when this route is provided to the translation module 208, it is enabled to receive GTP packets (A-type packet of FIG. 7A) and decapsulate the inner IP packet.

The translation module 208 obtains the destination IP address of the inner IP packet and determines that the route specifies that packets addressed to the destination IP address should be forwarded to the routing module 216. The translation module 208 then forwards the inner IP packet as an SRv6 packet (C-type packet of FIG. 7A) with the SID (e.g., prefix SID of the routing module 216) specified by the route. The C-type packet may be forwarded to the routing module 216 over the network 210, which may be embodied as an level 3 (L3) VPN with SRv6 in the embodiments of FIGS. 7A to 7D.

The routing module 216 receives the C-type packet, decapsulates the inner IP packet (D-type packet of FIG. 7A) and forwards the inner IP packet over the external network 214 to the destination IP address.

In some embodiments, the BGP module 324 may also instruct the translation module 208 to perform A VPN service associated with the service SID of a VPN (VPNv4/v6).

FIG. 7B illustrates an approach for using the BGP module 324 and translation module 208 to manage routing of traffic from the UE 102 to the UPF 112 by way of the translation module 212. For example, 5G defines GTP-U messages. GTP-U messages may be used to check and/or detect the data path information between gNodeB 106 and the UPF 112. Other GTP-U messages include Echo request and Echo reply to detect that this data path is healthy. GTP-U messages may also be used to communicate error indications in response to an error on the data path. GTP-U messages may include an end marker to inform the end of a data packet transfer (e.g., when handover has happened). In case of the user data traffic addressed the external network 214, the translation module 208 can strip off GTP header and encapsulate the inner IP packet in an SRv6 packet (C-type packet) and then forward the C-type packet directly to the translation module 212.

As in other embodiments described herein, the BGP module 324 obtains 706 information from the PFCP proxy 322 and/or CLI controller 708. The information relevant to the functionality of FIG. 7B may include the remote TEP address of the GTP tunnel, VRF ID (or route distinguisher RD), and VPN information (VPNv4/v6 information).

To enable processing of GTP-U messages by the UPF 112 and/or gNodeB 106, the translation module 208 may forward the GTP-U messages to the UPF 112. As noted above, this may include the use of the second translation module 212 between network 210 and the UPF 112. The translation module 212 may translate packets from SRv6 to GTP before forwarding the GTP packets to the UPF 112. In order to do this, the GTP information may be embedded in the SRH field of the SRv6 packets forwarded to the translation module 212, e.g., B-type packets.

Accordingly, the BGP module 324 may provide 710 a VPNv4/v6 update to the translation module 208 to provide a route to the UPF 112. The BGP module 324 may also provide 712 an SR policy to the translation module 208 that instructs the translation module 208 to translate GTP packets addressed to the UPF 112, this translation including encoding the GTP information in the SRH field as described above. The VPNv4/v6 update and the GTP information may be obtained by the BGP module 324 from information received from the PFCP proxy 322 as described above. The programming 710 may include providing the translation module 208 with a VPNv4/v6 update including a route to UPF 112. The programming 710 may include programming the translation module 208 with this route in a specific VRF. Based on this programming 710, translation module 208 can route the packet from gNodeB 106 to the UPF 112.

The programming 710 provided by the translation module 208 to the UPF 112 may further manage routing according to a VRF routing distinguisher (RD) to which the gNodeB 106 is connected and 5G network instance (access) to which the gNodeB 106 belongs. The CLI controller 708 may provide a mapping between a first VRF RD where gNodeB 106 is connected and the 5G Network Instance (access) to which the gNodeB 106 belongs as well as a second VRF RD for the destination IP address of the inner IP packet (e.g., inner IP packet encapsulated by a GTP packet). The PFCP proxy 322 may provide an address of the UPF and the 5G network instance (access) to which gNodeB 106 belongs.

Using this information, the BGP module 324 determines which VRF RD is matched to the 5G Network instance (access, i.e. the network including the UPF 112) provided by PFCP Proxy 322. Then BGP module 324 may perform the following operations: send, to the translation module 208, a VPNv4/v6 update for a route to the UPF for the first VRF RD which was matched to 5G Network Instance (access); and send an SR Policy to inform the translation module 208 of the translation rule described above (defining translation from GTP to SRv6 with embedded GTP information) and the second VRF RD associated with the destination address of the inner IP packet.

The SR policy and VPNv4/v6 may program the translation module 208 to perform the following functionality:

Receive a GTP packet whose destination address is the address of the UPF 112;

Check the packet type of the GTP packet;

If the packet type of the GTP packet is user data traffic, strip off the GTP header to obtain the inner IP packet, forward the inner IP packet using the routing table for the VRF RD provided by the BGP module 324 (e.g., execute standard L3VPN SRv6 forwarding).

If the GTP packet is a GTP-U message, perform translation from GTP to SRv6 based on the translation rule (e.g., a GTP4/6.D rule) provided by the BGP controller (e.g., translation to a B-type packet with GTP information embedded in the SRH' filed).

In some embodiments, the VPNv4/v6 update for the UPF address has a binding SID value as the prefix SID. Accordingly, the VPNv4/v6 update is coupled to a specific SR policy, i.e. the SR policy received from the BGP module 324. The SR policy received from the BGP module 324 may also include the same binding SID and also include the VRF RD for the inner IP packet. Based on this, when the translation module 208 receives a GTP packet whose destination matches the UPF address, the translation module 208 may apply the SR policy to the GTP packet.

In some embodiments, the SR policy may instruct the translation module 208 to evaluate whether the destination address of the inner IP packet is an IPv6 linklocal address. If so, the translation module 208 may perform the same translation from GTP to SRv6 according to the SR policy as described above followed by forwarding to the translation module 212. However, since the linklocal address is not globally routable, only the UPF 112 can process such a packet. Therefore, the translation module 208 needs to send the translated SRv6 packet out to UPF 112. The SR policy may instruct the translation module to check, for each GTP packet, whether the destination address of the inner IP packet is linklocal and, if so, translate the GTP packet into an SRv6 packet while embedding GTP-related information in the SRH field of the SRv6 packet and forward the SRv6 packet to the translation module 212. The translation module then translates the SRv6 packet back into a GTP packet using the embedded information and forwards the GTP packet to the UPF 112.

Based on the VPNv4/v6 update provided 710 by the BGP module 324, the translation module may be programmed with a routing entry for the UPF address in a routing table associated with the first VRF RD (outer VRF for network where the gNodeB 106 is connected). The SR policy provided at step 712 may associate the second VRF RD (inner VRF for network to which the UPF 112 is connected) with a binding SID. The binding SID may invoke application of the SR policy to inner IP packets addressed to the UPF address and the second VRF RD. The binding SID may be used as the service SID for the VPNv4/v6 update for the UPF address. The binding SID may also be carried in the SR policy. The SR policy can carry the inner VRF RD which is used for routing the inner IP packet. Accordingly, in view of this programming, a GTP packet received from the gNodeB 106 may be processed by the translation module 208 as follows:

- Execute a routing lookup based on the destination address (UPF address) in a routing table associated with the VRF RD that is associated with the incoming interface over which the GTP packet was received;
- Obtain the SR policy based on the binding SID that is used as the service SID for the VPNv4/v6 update for the UPF address;
- Check the message type;
- If the message type is G-PDU, the translation module 208 strips of the GTP header to obtain the inner IP packet, encapsulates the inner IP packet in an SRv6 packet, and routes the SRv6 packet according to standard SRv6 L3VPN using the second VRF RD (inner VRF for the destination IP address of the inner IP packet) as specified by the SR policy; and
- If the message type is GTP-U, the translation module 208 generates a special service SID that carries GTP related information such as UPF address, QFI, and TEID, and the SRv6 locator according to the SR policy; encapsulates the inner IP packet of the GTP packet in an SRv6 packet including the special service SID and sends the SRv6 packet to the translation module 212.

The special service SID may be formatted as [ SRv6 locator of destination][UPF address+QFI+TED], where GTP4.D is used. Where GTP6.D is used the special service SID may be of the form [ SRv6 locator of destination][QFI+TEID+sid0], where sid0 is the UPF address.

FIG. 7C illustrates the functions of the BGP module 324 for configuring the routing module 216 to route packets received from the external network 214 and addressed to the UE 102. When a packet is received by the routing module 216 from the external network 214 and addressed to the UE 102, the routing module may use a route associated with the address of the UE 102. This route may be provided by the BGP module 324 to the routing module 216 using the approach shown in FIG. 7C.

The CLI controller 708 may provide 714 a mapping between a VRF RD and a 5G network instance (core), e.g., a VRF RD defined for the network 210. The PFCP proxy 322 may provide the UE address and a 5G network instance (core) including gNodeB 106.

Based on this information, the BGP module 324 may determine into which VRF to import packets addressed to the UE address based on the 5G network instance (core) within which such packets were received. After importing the UE address into the VRF identified by the VRF RD (i.e., a route to the UE address), the BGP 324 generates a VPNv4/v6 update to inform 716 the routing module 216 of the route to the UE 102.

When sending out this VPNv4/v6 update for the UE route, BGP module 324 may assign a service SID for the UE route. Accordingly, in response to the VPNv4/v6 update, the routing module 216 will receive inner IP packets from the external network 214 that include the UE address. In response to receiving inner IP packets including the UE address, the routing module 216, as instructed by the VPNv4/v6 updated, will encapsulate the inner IP packet in an SRv6 packet including this service SID as the destination. This service SID will instruct intervening components to route the packet to the UE according to the route, which will include the translation module 208 and the gNodeB 206.

When the translation module 208 receives the SRv6 packet from the network 210, the translation module 208 may need to translate the SRv6 packet to a GTP packet because GTP packet needs to be forwarded to UE by way of the gNodeB 106. The service SID may be encoded by the BGP module 324 to carry GTP related information, such as the address of the gNodeB, TEID, and QFI.

An IPv6 address is 128 bit. So, in case of GTP4.E (gNodeB address is IPv4), all of the GTP related information can be embedded into a single IPv6 address as follows: SRv6 Locator+gNodeB IPv4 address+QFI+TEID. Where the maximum SRv6 locator length is 56 bits, and the gNodeB address is an IPv4 address of 32 bits, this leaves 8 bits for the QFI and 32 bits for the TEID. In the case of GTP6.E in which the gNodeB 106 has an IPv6 address, it may be impossible to embed the address of the gNodeB 106 along with the GTP information in a single IPv6 address. In that case, SRv6 can carry multiple segments (IPv6 addresses) in the SRH. Accordingly, the last SID in the SRH (SID[0]) may be the IPv6 address of the gNodeB 106 and the penultimate SID (SID[1]) may carry the SRv6 locator, QFI, and TEID.

FIG. 7D illustrates the functions of the BGP module 324 for configuring the translation module 208 to route packets received from the external network 214 and addressed to the UE 102. These packets may be received by the translation module 208 from the routing module 216 over the network 210. The BGP module 324 may further configure the translation module 208 to translate such packets from SRv6 to GTP.

The BGP module 324 may receive 718 information from the CLI controller 708, such as the SRv6 locator for GTP4/6.E and the outer VRF connected to gNodeB for each VRF from which UE addresses are imported.

The BGP module 324 may provide an SRv6 locator identifying a function to be applied by the translation module 208, such as a GTP4/6.E or GTP4.D functions performing translation as described above. The SRv6 locator and corresponding translation function may be provided by the BGP module 324 to the translation modules 208, 212. This SRv6 locator may be included in the service SID as described above. The BGP module 324 generate and transmit 720 an SR policy to the translation module 208. The SR policy contains various instructions.

The SR policy may indicate SRv6 locator information (e.g., whether the locator information format is based on IPv6 prefix). The SR policy therefore enables the translation module 208 to understand the position of the gNodeB address, QFI, TED as embedded in the service SID (or SIDs) included in the SRH field as described above with respect to FIG. 7C (e.g., whether these items of information are in SID[0] or SID[1]). The SR policy may also carry a function such as a GTP4.E or GTP6.E function that instructs the translation module 208 to use the last segment of the SRH header to find the gNodeB address and perform translation from SRv6 to GTP using the embedded GTP information. The SR policy generated by the BGP module 324 may further provide the outer VRF for the UE address that is used to route the GTP packet to the UE 102 after the GTP packet is obtained from translating the SRv6 packet to GTP according to the SR policy.

FIG. 8 illustrates an example configuration of a translation module 208. The translation module 212 may have a similar configuration. In the illustrated embodiment, packets that are received from the gNodeB 106 and transmitted to the UPF 112 (e.g., GTP-U message) may be processed by a first forwarding information base (FIB) lookup module 800, GTP4/6.D processing module 802, SRv6 encapsulation module 804, and a second FIB lookup module 806. Packets that are received from gNodeB 106 and transmitted to the routing module 216 (e.g., non-GTP-U message) may be processed by the FIB lookup module 800, GTP 4.6.D module 802, a third FIB lookup module 808, an SRv6 encapsulation module 810, and a fourth FIB lookup module 812.

The first FIB lookup module 800 may evaluate the interface (IP address and VRF RD) on which a packet was received. If that interface is associating with the binding SID, then the SR policy associated with the binding SID invokes processing of the packet by the GTP4/6.D module 802 is invoked. The programming of the first FIB lookup module 808, generation of the binding SID and SR policy, and programming of the GTP4/6.d module may be performed by the BGP module 324 as described above.

The GTP4/6.D module 802 may be programmed with a function that is invoked by the SR policy. That function may evaluate the packet type of the GTP packet. If the packet is a GTP-U message, the packet is sent to the SRv6 encapsulation module 804. The SRv6 encapsulation module 804 may be programmed to transform the packet from a GTP packet (A-type) to an SRv6 packet with embedded GTP information (B-type). Further details on how this encapsulation is performed may be performed are described below with respect to FIG. 9A. The SRv6 packets generated by the SRv6 encapsulation module 804 may be processed by the second FIB lookup module 806. The second FIB lookup module 806 may evaluate the destination address of the SRv6 packet (i.e., the address of GTP/SRv6 212 in front of the UPF 112) and determine where to route the SRv6 packet. This may include using information from a VPNv4/v6 update to determine the next hop, VPN tunnel information, VRF RD or other information to use in order to route the SRv6 packet to the UPF 112. As noted above, the VPNv4/v6 update may be received from the BGP module 324. The translation module 208 then transmits the SRv6 packet according to the routing information obtained from the second FIB lookup module 806.

Where the GTP 4/6.D module determines that the GTP packet is not a GTP-U message, the GTP packet may be processed by the third FIB lookup module 808 after stripping off GTP/UDP/Outer IP header. The third FIB lookup module 808 may lookup information for encapsulating the inner IP packet of the GTP packet in an SRv6 packet. This may include, for example, looking up a VPNv4/v6 route associated with the destination address of the inner IP packet and deciding such SIDs to encapsulate the Inner IP packet in SRv6 packet. The SIDs may define routing of the SRv6 packet encapsulating the Inner IP packet through the network 210 and may be generated according to routing information received from the BGP module 324. The inner IP packet and SIDs may be provided to the SRv6 encapsulation module 810, which encapsulates the inner IP packet and SIDs into an SRv6 packet. The SRv6 packet may be processed by a fourth FIB lookup module 812.

The fourth FIB lookup module 812 may evaluate the destination address of the SRv6 packet (i.e., the address of the routing module 216) and determine where to route the SRv6 packet. This may include using information from a VPNv4/v6 update to determine the next hop, VPN tunnel information, VRF RD or other information to use in order to route the SRv6 packet to the routing module 216 in order to reach the external address. As noted above, the VPNv4/v6 update may be received from the BGP module 324. The translation module 208 then transmits the SRv6 packet according to the routing information obtained from the fourth FIB lookup module 812.

Figure 9A:
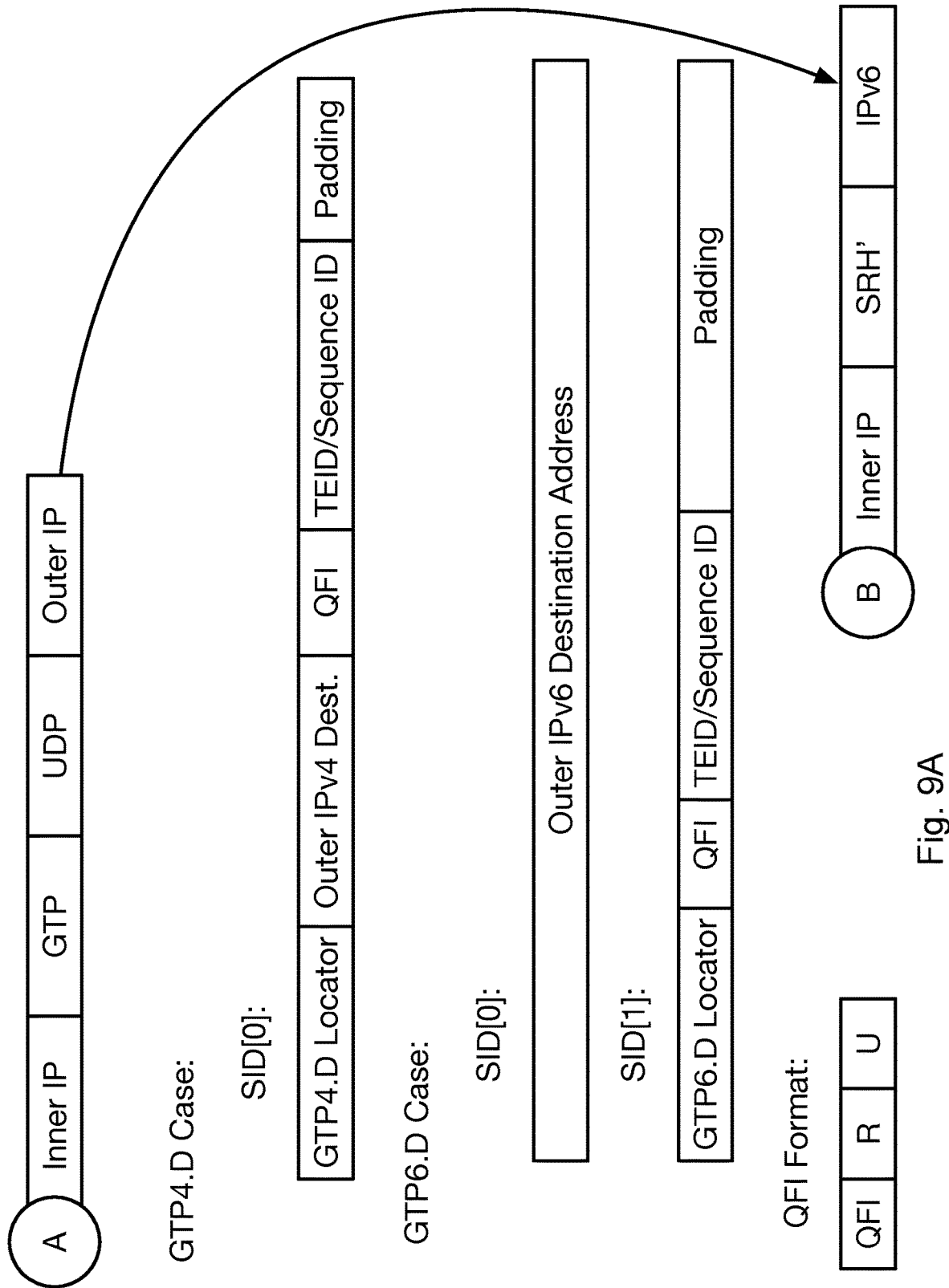
FIG. 9A is a schematic block diagram illustrating translation from GTP to SRv6 in accordance with an embodiment of the present invention.

FIG. 9A illustrates the process of translating a GTP (A-type) packet received by the translation module 208 into an SRv6 packet with embedded GTP information (B-type) packet. As noted above, an A-type packet may include an inner IP packet (e.g., destination address in the external network), a GTP header, and an outer IP header (e.g., destination address of the UPF 112). In the case of GTP4.D, the SIDs included in the SRH' field of the B-type packet may be as shown. In the case of GTP4.D, a single SID (SID[0] or the first SID in the SRH' field) includes a GTP4.D locator as described above, the outer IP address (address of UPF 112), and GTP information, such as the QFI, TEID, sequence ID which is used for some GTP-U message (e.g, GTP-U echo request/reply message). In some embodiments, additional padding bits may be included. The QFI information may include the QFI, R, and U values. QFI is the QoS (quality of service) Flow Identifier defined in 3GPP. R is the RQI (reflective QoS Indication) defined in 3GPP. The U bit is used to specify PDU (protocol data unit) type for the GTP-U packet. In the case of GTP6.D, two SIDs (SID[0] and SID[1]) may be used. SID[0] may include the outer IP address (address of UPF 112) and SID[1] may include the embedded GTP information such as the QFI, TED, sequence ID.

Figure 9B:
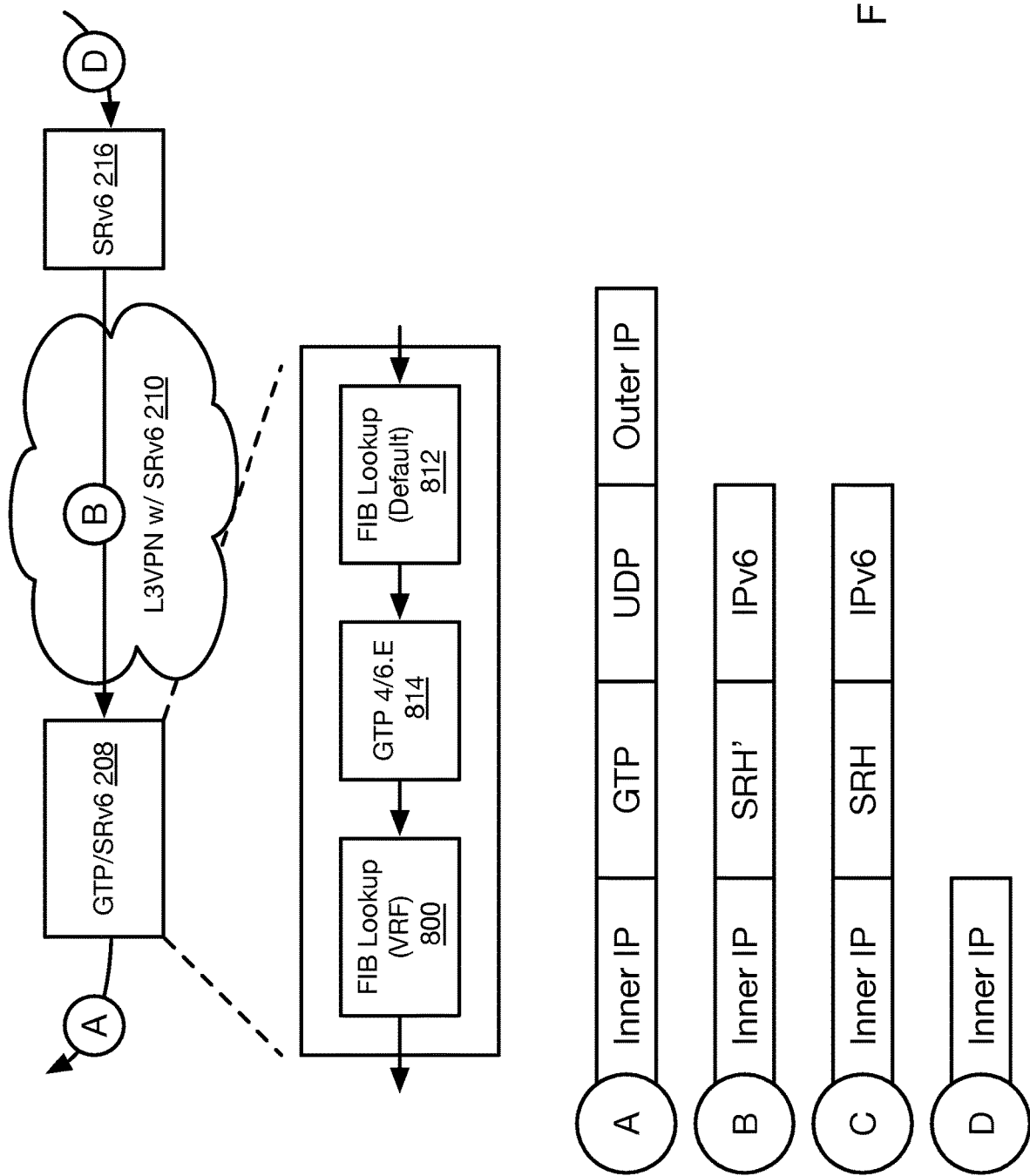
FIG. 9B is a schematic block diagram further illustrating operation of the translation module in accordance with an embodiment of the present invention.

FIG. 9B illustrates the function of the translation module 208 when processing SRv6 (B-type packets) with embedded GTP information received from the routing module 216. The FIB lookup module 812 receives the packet and determines a binding SID associated with the interface (source address and VRF RD) over which the packet was received. The SR policy associated with the binding SID may invoke a GTP4/6.E module 814. The GTP4/6.E module 814 may convert the SRv6 packet to a GTP (A-type) packet using the embedded GTP information. The programming of the GTP4/6.E module 814 as well as the binding SID and SR policy may be received from the BGP module 324 as described above.

The GTP packet may be processed by the FIB lookup module 800, which determines the VRF RD associated with the destination address (e.g., gNodeB 106 address or the UPF address) and routes the GTP packet according to a routing table for that VRF RD. Routing performed by the FIB lookup module 800 may be according to a VPNv4/v6 update received from the BGP module 324 as described above. FIG. 9B illustrates the packet flow for a downlink (the external network 214 to UE 102 or UPF 112 to UE 100). For such packet flow, the FIB lookup module 812 may be programmed to determine a routing entry pointing to GTP4/6.E module 814. The GTP4/6.E module 814 may then translate each SRv6 packet into a GTP packet. This GTP packet may then be routed to FIB lookup module 800.

Figure 9C:
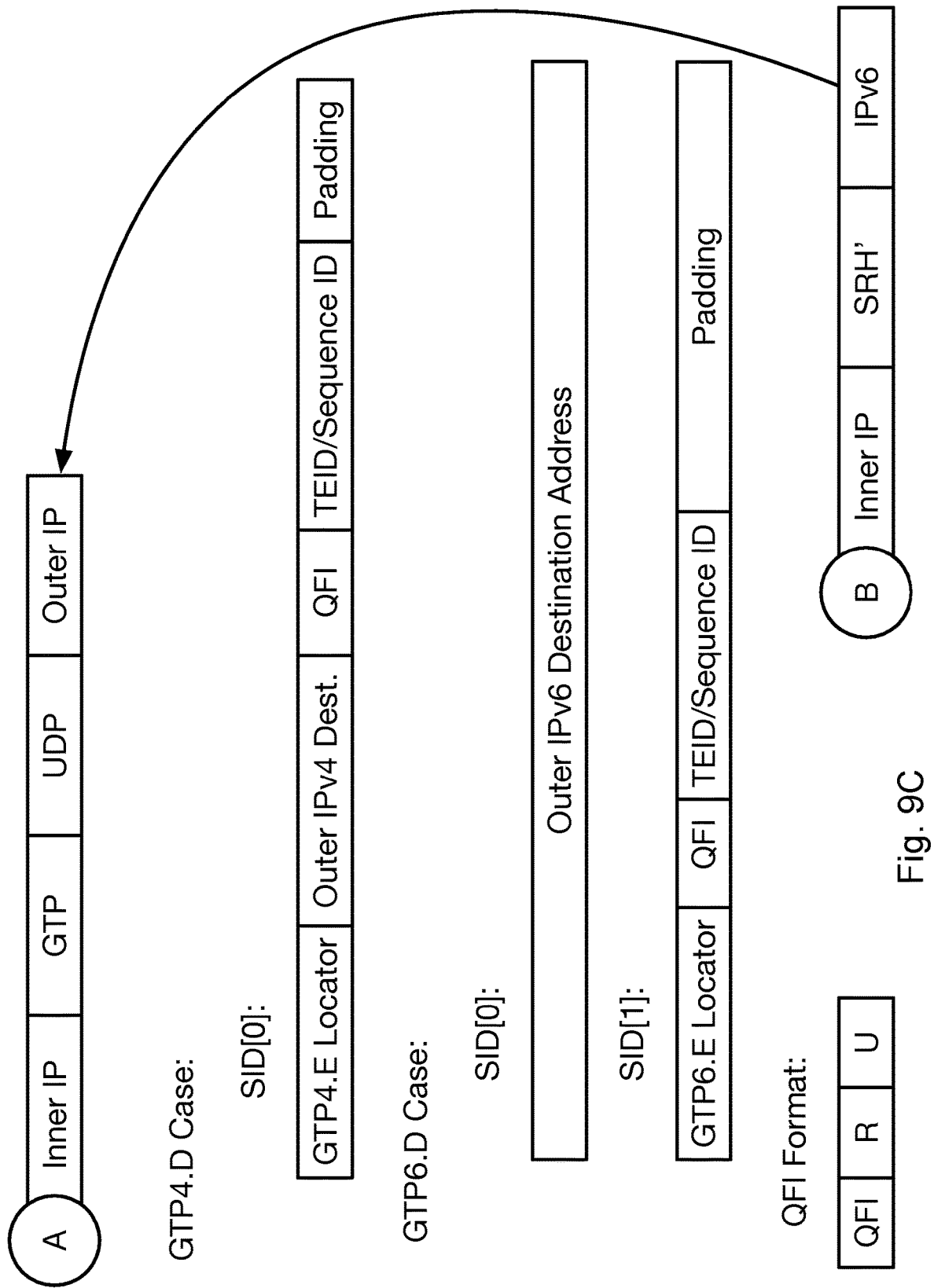
FIG. 9C is a schematic block diagram illustrating translation from SRv6 to GTP in accordance with an embodiment of the present invention.

FIG. 9C illustrates the translation from a B-type packet to an A-type packet. The embedded information in the SRH' field is obtained. As noted above, in the case of GTP4.E, this information will be included in SID[0]. In the case of GTP6.E, this information will be included in SID[1]. The GTP4.E locator in the SRH' field is associated with a GTP4.E function that performs translation using the outer IPv4 destination address and the embedded GTP information (QFI, TEID/SequenceID). Translation may include using the outer IPv4 destination address (e.g., address of gNodeB) as the outer IP destination address of the A-type packet and including the embedded GTP information in the GTP field of the A-type packet. The inner IP packet may is forwarded to the address of UE 102.

FIGS. 8, 9A, 9B, and 9C are described with respect to the translation module 208. The translation module 212 likewise performs translation between A-type and B-type packets and may function in a like manner. In particular, packets traveling from the UPF 112 to the gNodeB 106 may be translated in the same manner as packets from the gNodeB 106 to the UPF 112. Packets traveling from the SRv6 216 to UE 102 may be processed in the same manner as packets from UPF 112 to gNodeB 208. Stated differently, the translation from SRv6 to GTP may be performed by translation modules 208, 212 when receiving the packets from the network 210 regardless of the entity that is sending out the packet (either the other translation module 208, 212 or the routing module 216).

Figure 10A:
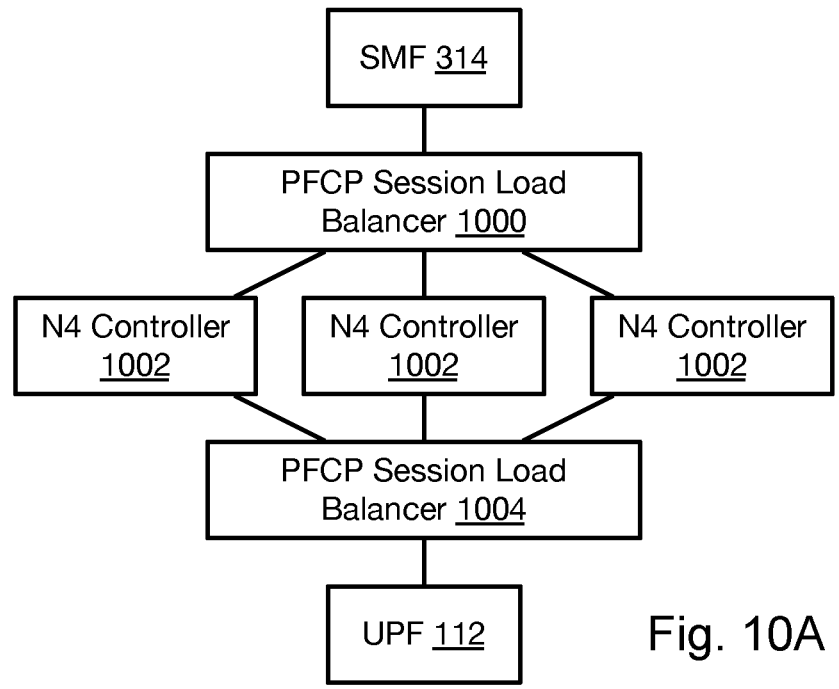
FIG. 10A is a schematic block diagram of a load balancing PFCP proxy in accordance with an embodiment of the present invention.

Referring to FIG. 10A, the approaches described herein may make use of a PFCP proxy 322 in order to obtain information describing a GTP tunnel that may then be embedded in SRv6 packets. In order to interface with the SMF 314 and UPF 112, the PFCP proxy 322 may implement an N4 interface. An N4 interface may be an interface between a 5G network and the user plane, such as the UPF 112. In prior approaches, an N4 interface is created for each UE 102. Accordingly, the PFCP proxy 322 when used according to prior approaches may create 2X N4 interfaces, where X is the number of UE 102, since the PFCP proxy 322 implements an interface to both the SMF 314 and the UPF 112. A given UPF 112 may manage many thousands of UE 102 such that the load placed on the PFCP proxy 322 may be very large.

In some embodiments, on the side of the SMF 314, a PFCP session load balancer 1000 distributes traffic to a plurality of N4 controllers 1002. On the side of the UPF 112, another PFCP session load balancer 1004 distributes traffic to the plurality of N4 controllers 1002. Each of the N4 controllers 1002 may implement a PFCP proxy 322. In particular, each N4 controller 1002 may perform the functions ascribed herein to the PFCP 322 with respect to traffic that is routed to it. The traffic routed from the load balancers 1000, 1004 to the N4 controllers 1002 may include PFCP requests and responses as described above with respect to FIGS. 1 to 5. The N4 controllers 1002 may therefore snoop session information as described above. This snooped information may include some or all of the address of a gNodeB 106 for a GTP tunnel, address of the UPF 112, address of the UE 102, TEID, QFI, access network instance, and core network instance.

The load balancers 1000, 10004 and N4 controllers 1002 may be executing on the same computing device, in different virtual machines or containers on the same computing device, or on separate computing devices connected by a network.

Figure 10B:
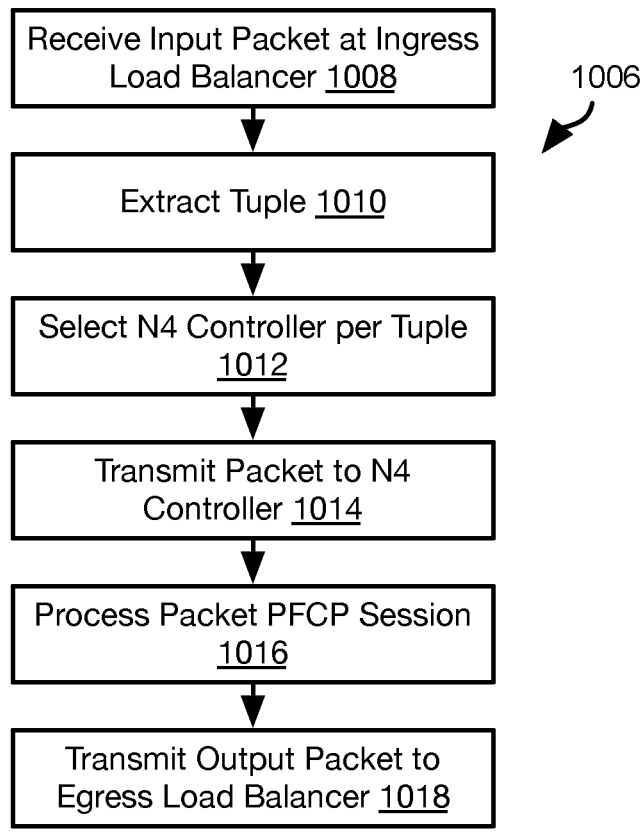
FIG. 10B is a process flow diagram of a method for performing load balancing of PFCP sessions in accordance with an embodiment of the present invention.

FIG. 10B illustrates a method 1006 that may be executed using the load balancers 1000, 1004 and N4 controllers 1002. The method 1008 may include an ingress load balancer receiving 1008 an input packet, such as a GTP packet. For input packets addressed to the UPF 112 and received from the SMF 314, the ingress load balancer may be the load balancer 1000. For input packets addressed to the SMF 314 and received from the UPF 112, the ingress load balancer may be the load balancer 1004.

The ingress load balancer may then extract 1010 a tuple from the input packet. The tuple may be a set of values that are used to distribute packets among the plurality of N4 controllers. The tuple may include some or all of the following items of information from the input packet: IP source address, IP destination address, session identifier (SEID), and fully qualified session identifier (FQ-SEID). The IP source address and IP destination address may an address of either of the SMF 314 and UPF 112 to from which the input packet was received or to which the input packet is addressed, respectively. In some implementations, multiple SMF 314 and UPF 112 may transmit packets to the ingress load balancer. In such implementations, load balancing may be performed with just the IP source address and IP destination address. Where there is a single SMF 314 and single UPF 112, the SEID and/or F-SEID may be used and the source and the IP source and IP destination addresses may be ignored.

The ingress load balancer may then select 1012 one of the N4 controllers 1002 corresponding to the tuple. For example, the tuple may be input to a hash function with the output of the hash function being an identifier of one of the N4 controllers 1002. The input packet may then be transmitted 1014 to the selected N4 controller 1002. The selected N4 controller 1002 may then process 1016 the input packet. This may include snooping session information and performing other functions of a PFCP proxy, such as those described above with respect to FIG. 5 and any of the other functions ascribed herein to the PFCP proxy 322. The N4 controller 1002 may generate an output packet in response to the input packet. The output packet may then be transmitted 1018 by the N4 controller 1002 to an egress load balancer. For input packets addressed to the UPF 112 and received from the SMF 314, the egress load balancer may be the load balancer 1004. For packets addressed to the SMF 314 and received from the UPF 112, the egress load balancer may be the load balancer 1000. The egress load balancer may then forward the output packet to the destination address of the output packet, which may be the same as the destination address of the input packet.

Figure 11:
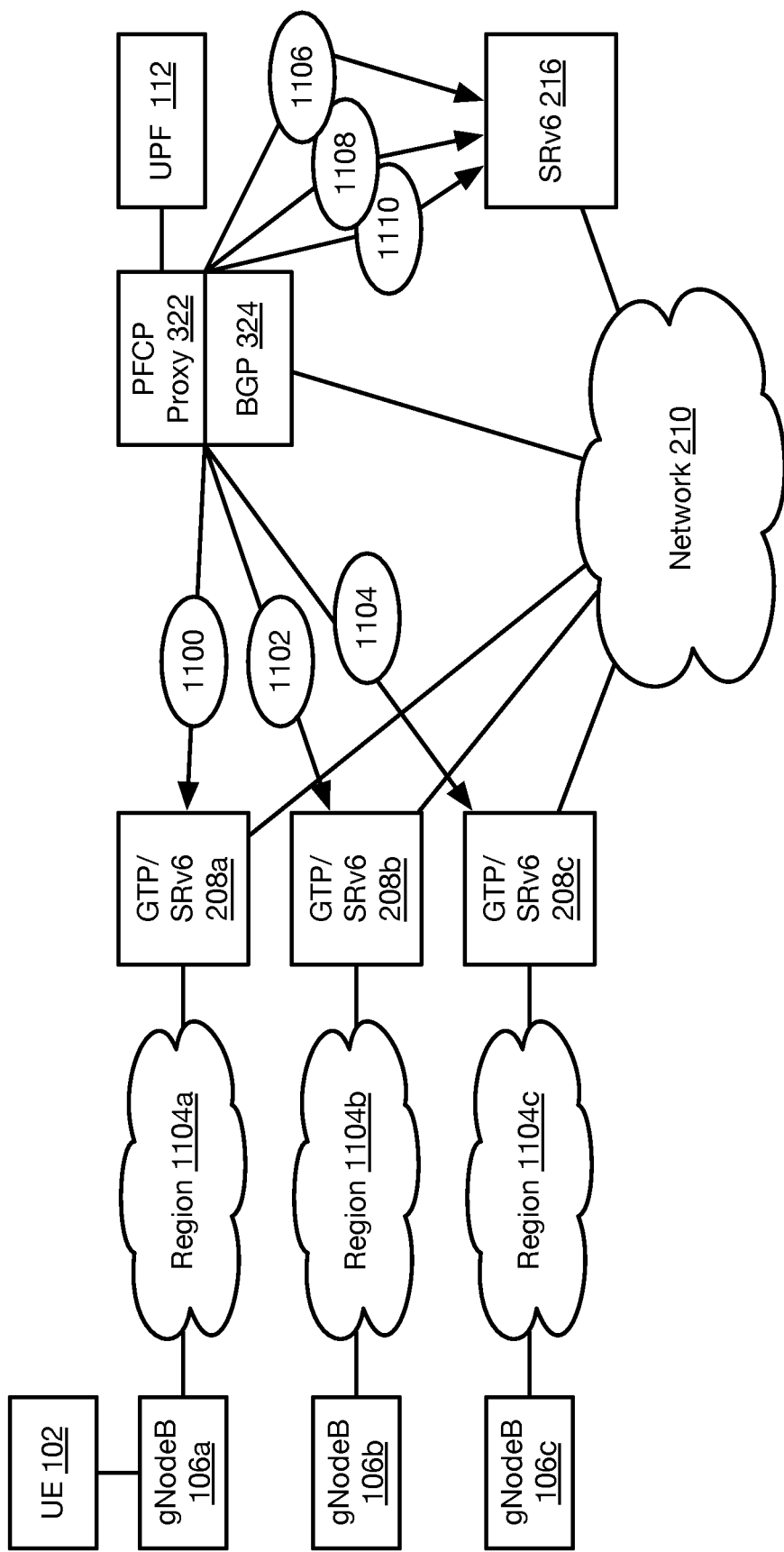
FIG. 11 is a schematic block diagram illustrating the non-selective distribution of routing information in accordance with an embodiment of the present invention.

Referring to FIG. 11, the approach described above may be practiced in the illustrated network environment in which there are multiple gNodeB 106a-106c and multiple translation modules 208a-28c. Each translation module 208a-208c may connect a region 1104a-1104c of a cellular data network to the network 210. Each gNodeB 106a-106c may connect to one of the translation modules 208a-208c by means of one of the regions 1104a-1104c.

Using the approach described above, the BGP module 324 transmits 1100 a first SID (SID1) to one translation module 208a to enable translation of packets received from and transmitted to all UE 102 connected to gNodeB 106a. The BGP module 324 transmits 1102 a second SID (SID2) to translation module 208b to enable translation of packets received from and transmitted to all UE 102 connected to gNodeB 106b. The BGP module 324 transmits 1104 a third SID (SID3) to translation module 208c to enable translation of packets received from and transmitted to all UE 102 connected to gNodeB 106c. Each SID may have a corresponding SR policy defining translation of packets as described above.

The BGP module 324 may also transmit 1106, 1108, 1110 a VPNv4/v6 update corresponding to each gNodeB 106a, 106b, 106c, respectively. The VPNv4/v6 update for a given gNodeB 106a-106c may include the SIDs assigned to that gNodeB 106a-106c. The VPNv4/v6 updates may be transmitted to one or more routing modules 216 connected to the network 210. The routing module 216 may be a provider edge router (PE).

In some implementations, each translation module 208a-208c is assigned its own VRF by the BGP module 324. The VRF may be used to implement each GTP tunnel that is translated by the translation module 208a-208c. The route distinguisher (RD) of each VRF enables the routing module 216 to determine where to send packets. When a UE 102 connects to a gNodeB 106 and the PFCP proxy 322 obtains the UE address for the UE 102, the BGP module 324 may determine the VRF (i.e., VRF table) into which the UE address should be imported. In some embodiments, the PFCP proxy 322 obtains an access network instance and the VRF is selected as corresponding to that access network instance.

In some implementations, the BGP module 324 has separate VRF tables for each translation module 208a-208c. However, in some implementations, routing module 216 has a single VRF because the routing module 216 must be able to reach to any translation module 208a-208c. Accordingly, if the BGP module 324 imports routes for each UE 102 to all VRFs (each of VRF being be associated with one of the translation modules 208a, 208b or 208c), the BGP module 324 will provide three VPN v4/v6 updates to the routing module SRv6 216 for each UE 102, i.e., one for translation module 208a, another for translation module 208b, and yet another for translation module 208c. In a typically implementation, there may be many more translation modules 208. The routing module 216 will then import routes from all of the VPN v4/v6 updates into a single VRF (each route having a same prefix (UE address) but having a different nexthop and SID corresponding to the different translation modules 208a, 208b, 208c).

When the translation module 216 receives a packet from the external network 214, the routing module 216 needs to select one route for the packet. However, the routing module 216 may not know which gNodeB 106 is connected to a UE 102 reference by a UE address in the packet. The routing module 216 therefore might not be able to forward the packet correctly. In addition, there is excessive memory usage by the routing module 216 from storing the updates for each translation module 208a, 208b, 208c for each UE address.

In some embodiments, these issues are resolved by the PFCP Proxy 322 and/or BGP 324 determining which gNodeB 106 is connected to a given UE 102. The BGP 324 may therefore generate a single VPN v4/v6 update corresponding to the gNodeB 106 to which the UE 102 is connected, i.e., for the VRF of whichever routing module 208a, 208b, 208c is connected to that gNodeB 106. This resolves the issues identified above since the routing module 216 will receive and store only one route for each UE address from the single VPN v4/v6 update.

As described below, the BGP module 324 may receive PFCP Information (gNB address, UE address) as described above and receive a VPN v4/v6 update for a gNodeB address from each PE 1202a, 1202b, 1202c. Based on this, the BGP module 324 can figure out which gNodeB 106 a given UE 102 is connected to. The BGP module may determine the route target (RT) value for each gNodeB address from the VPN v4/v6 update. Based on the RT value, the BGP module 324 can determine into which VRF a UE route should be imported.

Figure 12A:
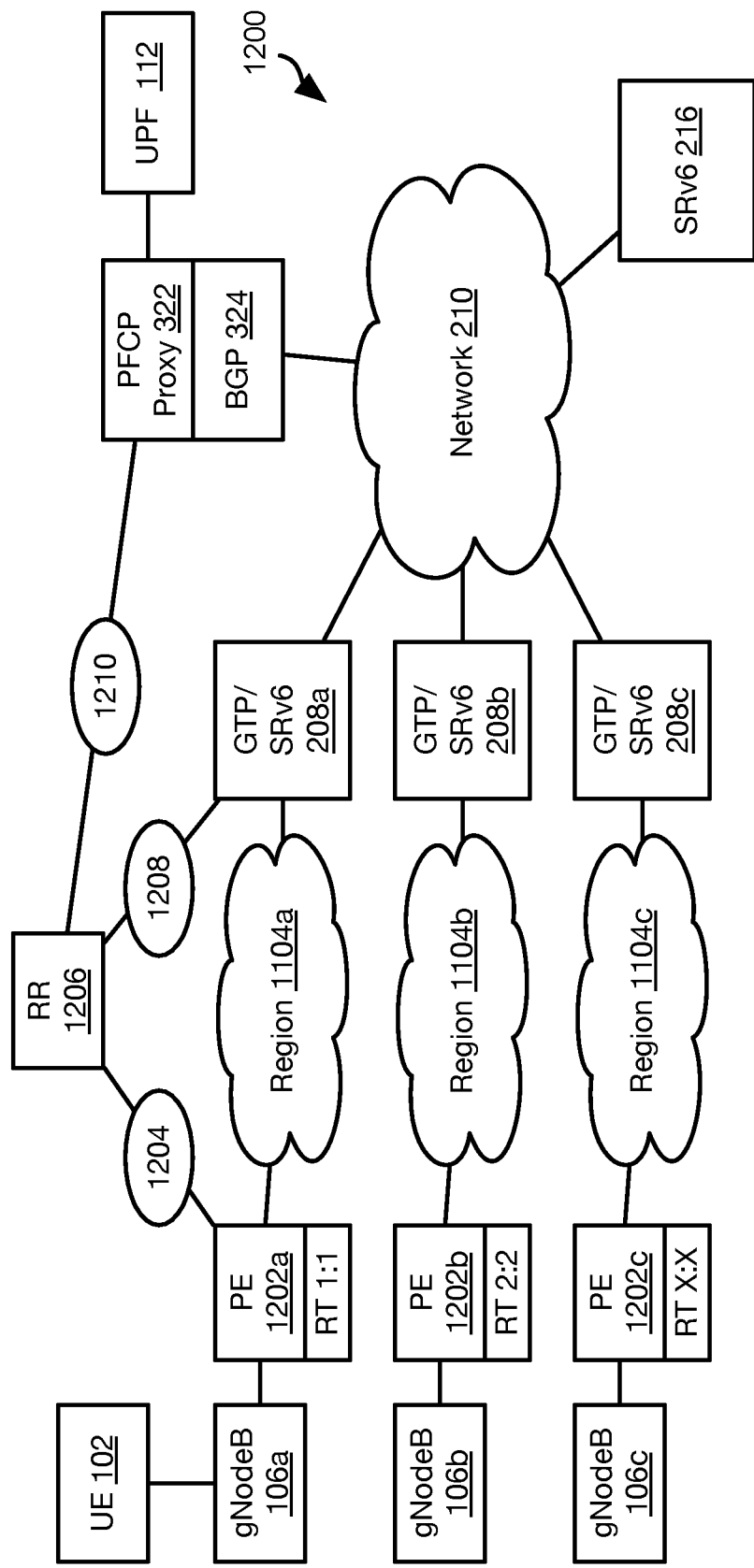
FIG. 12A is a schematic block diagram of a network environment for performing selective distribution of routing information in accordance with an embodiment of the present invention.

FIG. 12A illustrates a network environment 1200. The illustrated network environment 1200 shows elements in addition to those shown in the network environment 100 and omits some elements shown in the network environment 100. In practice, a network environment may include all of the elements shown in the network environments 100, 1200. The illustrated network environment 1200 may be used to more efficiently distribute routing information for traversing the network 210.

UE 102 may connect to any of the gNodeB 106a-106c. Each gNodeB 106a-106c may connect to a provider edge router (PE) 1202a-1202c. Multiple gNodeB 106a-106c may also connect to a single PE 1202a-1202c. Each PE 1202a-1202c may connect to a corresponding region 1104a-1104c. Each region 1104a-1104c may be a portion of a network. Each region 1104a-1104c may be a packet radio network, such as a GTP network such that packets transmitted over each region 1104a-1104c are GTP packets as described above. Each PE 1202a-1202c may have a unique route target (RT) associated therewith, such as RT 1:1, RT 2:2, and RT X:X in the illustrated embodiment. A route target identifies each PE 1202a-1202c and is used to determine which routes to import into a given VRF. In particular, a VPN route may be labeled with one or more route targets such that only routers or other network components labeled with the one or more route targets will import that VPN route into the VRF thereof.

Each region 1104a-1104c may be connected to a translation module 208a-208c. Each translation module 208a-208c may function as a translation module 208 and receive traffic from the gNodeB 106, translate GTP packets to SRv6 packets, and transmit packets over an SRv6 network 210. Each translation module 208a-208c, as described above, may also receive packets from the SRv6 network 210, translate the packets to GTP packets using embedded information and/or an SR Policy, and forward the translated packets to the gNodeB over the region 1104.

In operation, for each UE 102 connected to gNodeB 106a, for example, the PE 1202a (used as representing any of the PE 1202a-1202c) transmits 1204 a VPNv4/v6 update. The VPNv4/v6 update may include such information as an address of the gNodeB 106a (e.g. network layer reachability information (NLRI)). The VPNv4/v6 update may further include the RT of the PE 1202a. In some embodiments, the VPNv4/v6 update may list the N4 access network instance to which PE 1202*a* is connected. The VPNv4/v6 update may be transmitted by way of a route reflector (RR) s. The route reflector 1206 may forward 1208 the VPNv4/v6 update to the translation module 208*a* connected to the same region 1104*a* as PE 1202*a*. The route reflector 1206 may also forward 1210 the VPNv4/v6 update to the PFCP proxy 322.

In some embodiments, the route reflector 1206 forwards 1210 the VPNv4/v6 update to the UPF 112. The PFCP proxy 322 intercepts the VPNv4/v6 update as it snoops session information on packets to and from the UPF 112. The PFCP proxy 322 may retain each VPNv4/v6 update. This may be the case even where a VRF has not been configured (or the PFCP proxy 322 has not been notified of the configuration) of a VRF corresponding to the RT of the PE 1202*a* that is received with the VPNv4/v6 update.

Figure 12B:
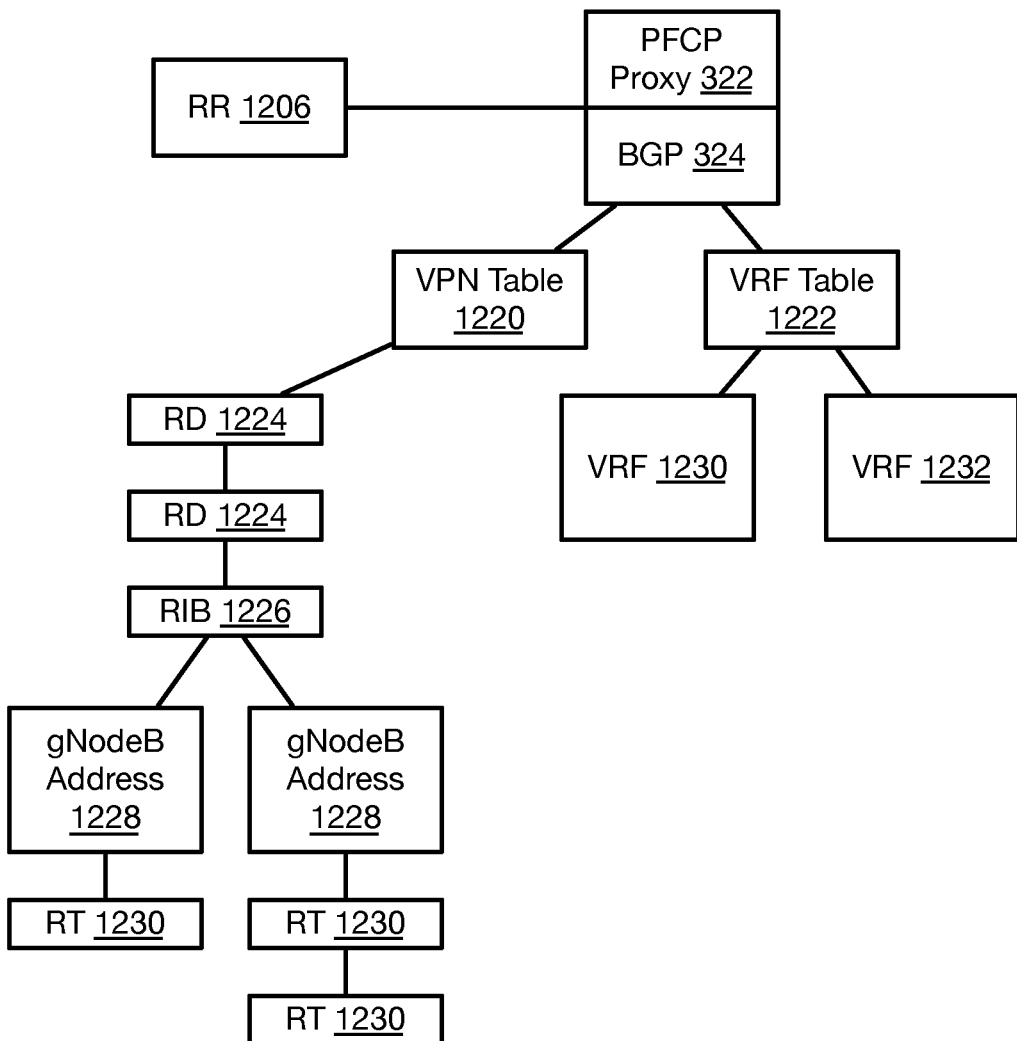
FIG. 12B illustrates an example relationship between entities in the network and the various labels and addresses that are used.

FIG. 12B illustrates an example relationship between entities in the network 1200 and the various labels and addresses that are used. The BGP 324 may maintain a VPN table 1220 and a VRF table 1222. The VPN table 1220 stores data received as VPNv4/v6 updates. The VPN table 1222 may, for example, include a hierarchy of route distinguishers 1224 for VPNs identified in the VPNv4/v6 updates. One or more route distinguishers 1224 may have a routing information base (RIB) 1226 associated therewith. The RIB 1226 may list, for a route distinguisher 1226, the gNodeB addresses associated with that route distinguisher 1226, such as due to the route distinguisher 1226 and gNodeB address 1228 being received in a VPNv4/v6 update. The entry in the VPN table 1220 for each gNodeB address 1228 may include one or more path attributes, such as NLRI route and/or address, next hop information, priority information (e.g. MED information), or the like. The path attributes for each gNodeB address 1228 may further include one more route targets 1230. For example, the VPNv4v6 update including a gNodeB address 1228 may further include the route target 1230 of the PE that sent the VPNv4/v6 update. Accordingly, the RT 1230 may be stored in the RIB 1226 in association with that gNodeB address 1228. In some embodiments, the route target sent with a VPNv4/v6 update may include information describing an extended route target community including the PE 1202*a*-1202*c* that sent the VPNv4/v6 update. Accordingly, each RT 1230 of the VPN table 1220 may include the information describing the extended route target community.

The VRF table 1222 may include entries 1232 describing VRFs identified in VPNv4/v6 updates received from the PEs 1202*a*-1202*c*. For example, as noted above, a VPNv4/v6 update may include a gNodeB address and the RT of one of the PE 1202*a*-1202*c*. In some embodiments, the VPNv4/v6 may include a N4 access network instance to which the PE 1202*a*-1202*c* is connected. Each entry 1232 may therefore list, for each VRF, a gNodeB address, and RT. In some embodiments, each VRF corresponds to a N4 access network instance and the entry 1232 may identify this N4 access network instance. There may be multiple VRFs for a given N4 access network instance. For example, each VRF table may correspond to a given N4 access network instance.

Figure 13:
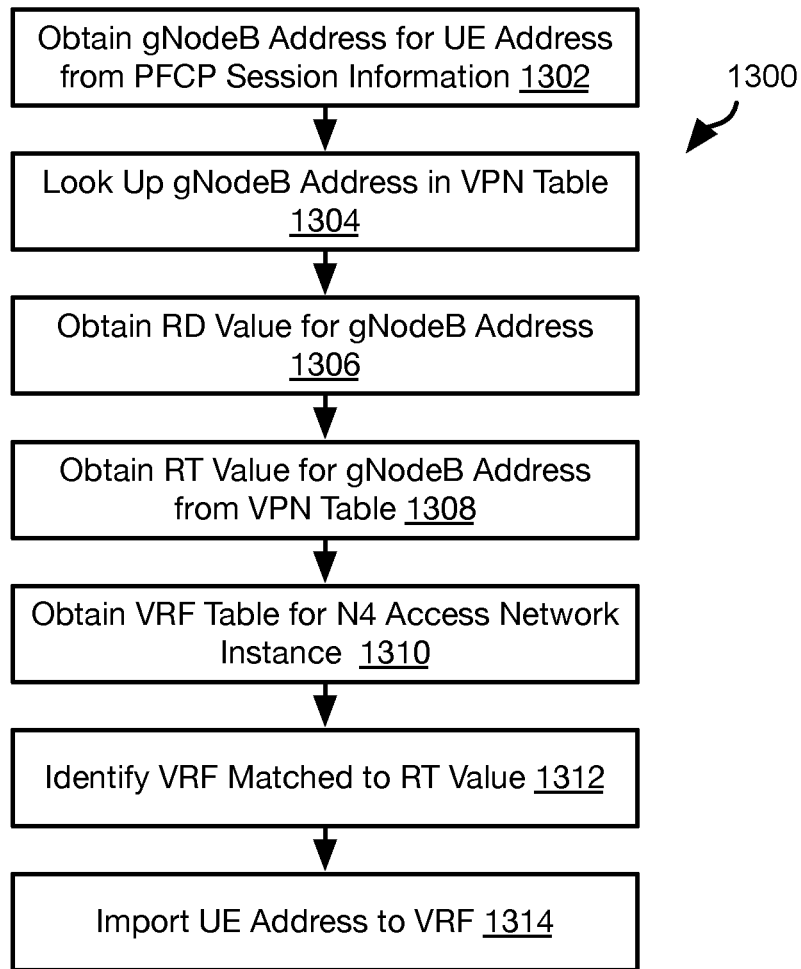
FIG. 13 is process flow diagram of a method for selective distribution of routing information in accordance with an embodiment of the present invention.

FIG. 13 illustrates a method 1300 that may be performed by the PFCP proxy 322 and the BGP module 324 associated therewith. The method 1300 may include obtaining 1302 a gNodeB address and an associated UE address from PFCP session information. As noted above, the PFCP session may further identify an N4 access network instance. The method 1300 may then include looking 1304 up the gNodeB address in the VPN table 1220 and obtaining 1306 a route distinguisher 1224 of the VPN mapped to the gNodeB address in the VPN table 1220. The method 1300 may further include obtaining 1308 a route target 1230 mapped to the gNodeB address in the VPN table 1220. The method 1300 may then include obtaining 1310 the VRF table corresponding to the N4 access network instance identified in the PFCP session information. The method 1300 may include identifying 1312 the VRF matched to the route target 1230 from step 1308. The method 1300 may then include importing 1314 the UE address to the VRF identified at step 1312. Importing 1314 the UE address to a VRF may be accompanied by the BGP module 324 sending a VPN v4/v6 update for the VRF to the routing module 216 indicating a route to the UE address.

In this manner, the UE address is not unnecessarily imported into each VRF of the N4 access network instance to which the gNodeB 106 is connected. This reduces the size of VRF tables on the routing modules 216 and the number of SIDs and corresponding SR policies that need to be sent to the translation modules 208*a*-208*c*.

Note that in some embodiments, once the VRF for a UE address is obtained, other actions may be performed, such as generating an SR policy and corresponding binding SID for the translation module 208*a*-208*c* to which the gNodeB 106 corresponding to the gNodeB address is connected. The SR policy and binding SID may be generated according to the approach described herein above.

Figure 14:
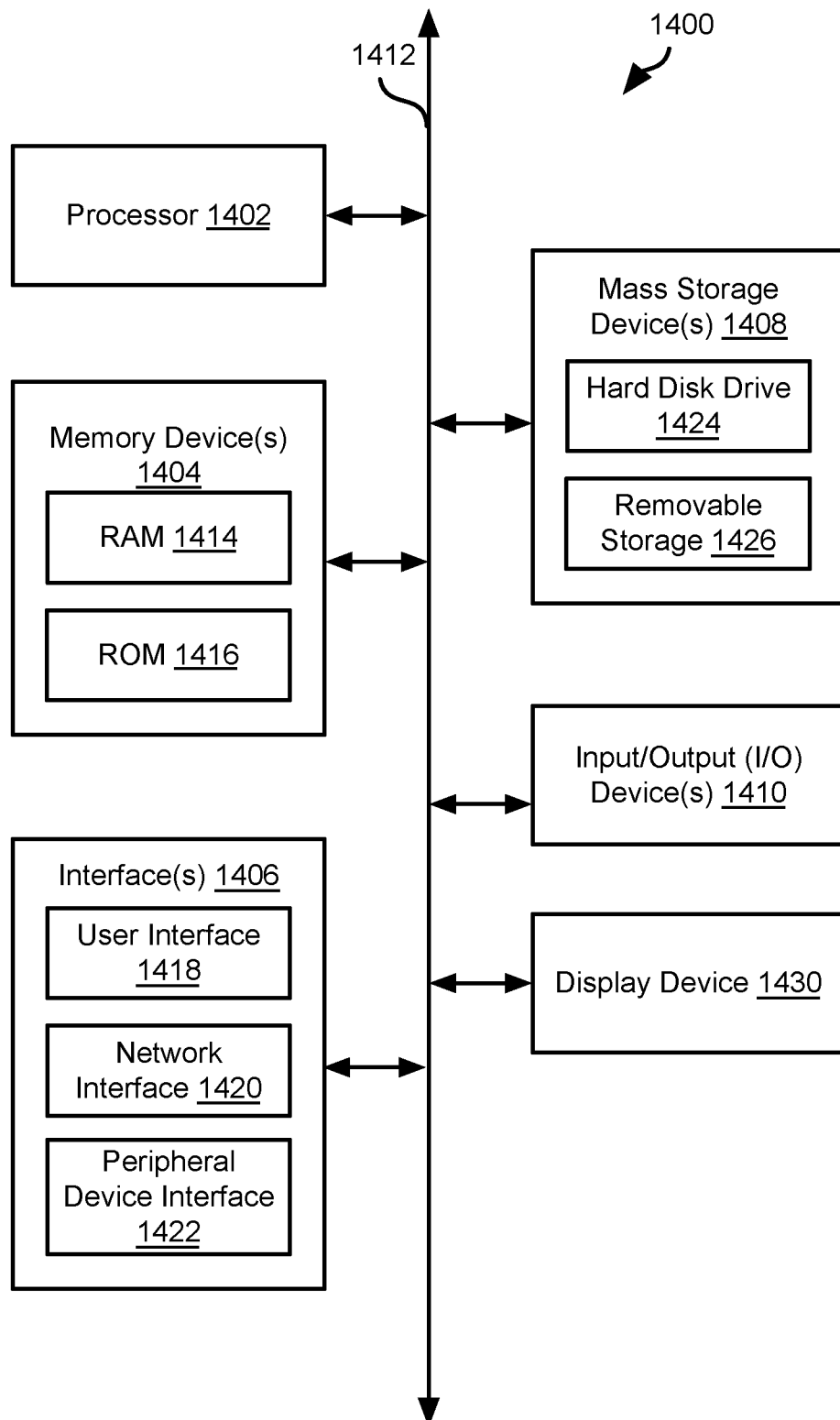
FIG. 14 is a schematic block diagram of a computer system suitable for implementing methods in accordance with embodiments of the present invention.

FIG. 14 is a block diagram illustrating an example computing device 1400 which can be used to implement the system and methods disclosed herein. Computing device 1400 can function as a server, a client, or any other computing entity. Computing device can perform various functions as discussed herein, and can execute one or more application programs, such as the application programs described herein. Computing device 1400 can be any of a wide variety of computing devices, such as a desktop computer, a notebook computer, a server computer, a handheld computer, tablet computer and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
   receiving, by a first load balancer, from a first entity, a first request referencing a second entity, the first load balancer executing on a computer system including one or more processing devices;
   selecting, by the first load balancer, a selected controller of a plurality of controllers executing on the computer system;
   transmitting, by the first load balancer, the first request to the selected controller;
   implementing, by the selected controller, a packet forwarding control (PFCP) session with respect to the first request, snooping session information from the first request, and transmitting the session information to a border gateway protocol (BGP) controller;
   transmitting, by the selected controller to a second load balancer, a second request corresponding to the first request, the second load balancer executing on the computer system; and
   forwarding, by the second load balancer, the second request to the second entity.

2. The method of claim 1, wherein the computer system comprises a plurality of computing devices connected by a network.

3. The method of claim 2, wherein the first load balancer executes on a first computing device of the plurality of computing devices, the second load balancer executes on a second computing device of the plurality of computing devices, the plurality of controllers execute on one or more third computing devices of the plurality of computing devices.

4. The method of claim 1, further comprising:
   receiving, by the second load balancer from the second entity, a first response to the second request;
   forwarding, by the second load balancer, the first response to the selected controller
   processing, by the selected controller, the first response, according to PFCP;
   transmitting, by the selected controller to the first load balancer, a second response corresponding to the first response; and
   forwarding, by the first load balancer, the second response to the first entity.

5. The method of claim 4, wherein the first request and first response are packets according to general packet radio service (GPRS) tunneling protocol (GTP) packet.

6. The method of claim 5, wherein the first request is a session initiation request.

7. The method of claim 5, wherein the session information includes a user equipment address.

8. The method of claim 5, wherein the session information includes a tunnel endpoint identifier.

9. The method of claim 5, wherein the first entity is a session management function (SMF).

10. The method of claim 5, wherein the second entity is a user plane function (UPF).

11. The method of claim 1, wherein selecting the selected controller comprises:
    extracting information from the first request; and
    selecting the selected controller as corresponding to the information.

12. The method of claim 11, wherein the information includes one or more of an internet protocol (IP) source address, an IP destination address, a session identifier (SEID), and a fully qualified session identifier (F-SEID).

13. The method of claim 11, wherein selecting the selected controller as corresponding to the information comprises:
    generating a hash from the information; and
    identifying the selected controller as being mapped to the hash.

14. A system comprising:
    one or more computing devices each including one or more processing devices and one or more memory devices coupled to the one or more processing devices, the one or more computing devices being programmed to perform a method including:
    receiving, by a first load balancer from a first entity, a first request referencing a second entity;
    selecting, by the first load balancer, a selected controller of a plurality of controllers according to a hash generated from address information in the first request;
    transmitting, by the first load balancer, the first request to the selected controller;
    implementing, by the selected controller, a packet forwarding control (PFCP) session with respect to the first request, snooping session information from the first request, and transmitting the session information to a border gateway protocol (BGP) controller;
    transmitting, by the selected controller to a second load balancer, a second request corresponding to the first request; and
    forwarding, by the second load balancer, the second request to the second entity.

15. The system of claim 14, wherein the one or more computing devices are further programmed the method by:
    receiving, by the second load balancer from the second entity, a first response to the second request;

forwarding, by the second load balancer, the first response to the selected controller processing, by the selected controller, the first response, according to PFCP;

transmitting, by the selected controller to the first load balancer, a second response corresponding to the first response; and forwarding, by the first load balancer, the second response to the first entity.

16. The system of claim 15, wherein the first request and first response are packets according to general packet radio service (GPRS) tunneling protocol (GTP) packet; and
wherein processing the first request comprises:
extracting the session information from the first request, the session information including a user equipment address and a tunnel endpoint identifier.

17. The system of claim 14, wherein the address information includes one or more of an internet protocol (IP) source address, an IP destination address, a session identifier (SEID), and a fully qualified session identifier (F-SEID).

* * * * *